US012741463B2

(12) United States Patent
Mori et al.

(10) Patent No.: US 12,741,463 B2
(45) **Date of Patent: *Sep. 22, 2026**

(54) LIQUID EJECTING HEAD AND LIQUID EJECTING APPARATUS

(71) Applicant: SEIKO EPSON CORPORATION, Tokyo (JP)

(72) Inventors: Masaki Mori, Shiojiri (JP); Motoki Takabe, Shiojiri (JP); Eiju Hirai, Azumino (JP)

(73) Assignee: SEIKO EPSON CORPORATION (JP)

( * ) Notice: Subject to any disclaimer, the term of this patent is extended or adjusted under 35 U.S.C. 154(b) by 271 days.

This patent is subject to a terminal disclaimer.

(21) Appl. No.: 18/512,557

(22) Filed: Nov. 17, 2023

(65) Prior Publication Data

US 2024/0165963 A1 May 23, 2024

(30) Foreign Application Priority Data

Nov. 18, 2022 (JP) ................................ 2022-184626

(51) Int. Cl.
*B41J 2/14* (2006.01)
*B41J 2/045* (2006.01)

(52) U.S. Cl.
CPC ....... *B41J 2/14233* (2013.01); *B41J 2/14201* (2013.01); *B41J 2/04566* (2013.01); *B41J 2002/14241* (2013.01); *B41J 2002/14266* (2013.01)

(58) Field of Classification Search
CPC ...... B41J 2/14233; B41J 2/14201; B41J 2/25; B41J 2/04566; B41J 2002/14241; B41J 2002/14266
See application file for complete search history.

(56) References Cited

U.S. PATENT DOCUMENTS 7,753,497 B2 * 7/2010 Yagi .................... B41J 2/14233
29/25.35
12,427,770 B2 * 9/2025 Takabe .................... B41J 2/161

FOREIGN PATENT DOCUMENTS

JP 2015-033834 A 2/2015

* cited by examiner

*Primary Examiner* — Geoffrey S Mruk
(74) *Attorney, Agent, or Firm* — Harness, Dickey & Pierce, P.L.C.

(57) ABSTRACT

A liquid ejecting head includes: a wiring substrate; a plurality of pressure chambers that accommodate a liquid and communicate with nozzles; a drive element that is electrically coupled to the wiring substrate and changes a pressure in the pressure chamber; and a humidity detection section that is electrically coupled to the wiring substrate and is disposed for detection of humidity.

19 Claims, 21 Drawing Sheets

LIQUID EJECTING HEAD AND LIQUID EJECTING APPARATUS

The present application is based on, and claims priority from JP Application Serial Number 2022-184626, filed Nov. 18, 2022, the disclosure of which is hereby incorporated by reference herein in its entirety.

BACKGROUND

1. Technical Field

The present disclosure relates to a liquid ejecting head and a liquid ejecting apparatus.

2. Related Art

There is known a liquid ejecting head including a pressure chamber plate provided with pressure chambers, a vibration plate for generating a pressure in the pressure chamber, and a piezoelectric actuator including a piezoelectric element provided on the vibration plate. For example, JP-A-2015-33834 discloses that a piezoelectric actuator is covered with a case portion and a humidity sensor is provided in a space inside the case portion. JP-A-2015-33834 is an example of the related art.

Performance of the piezoelectric actuator or a member in the vicinity of the piezoelectric actuator may be deteriorated because of an influence of humidity. The technique in the related art does not propose, for example, a specific structure for adopting a humidity sensor, such as a structure of the humidity sensor itself, a disposition position of the humidity sensor with respect to the piezoelectric actuator and the member in the vicinity of the piezoelectric actuator, and the like. As a result, there is a possibility that information on humidity in the piezoelectric actuator or the member in the vicinity of the piezoelectric actuator cannot be appropriately acquired. For this reason, in the liquid ejecting head, there is a demand for a technique for appropriately managing an influence of humidity on the piezoelectric actuator and the member in the vicinity of the piezoelectric actuator by using a simple structure.

SUMMARY

According to an aspect of the present disclosure, a liquid ejecting head is provided. A liquid ejecting head includes: a wiring substrate; a plurality of pressure chambers that accommodate a liquid and communicate with nozzles; a drive element that is electrically coupled to the wiring substrate and changes a pressure in the pressure chamber; and a humidity detection section that is electrically coupled to the wiring substrate and is disposed for detection of humidity.

DESCRIPTION OF EMBODIMENTS

A1. First Embodiment

Figure 1:
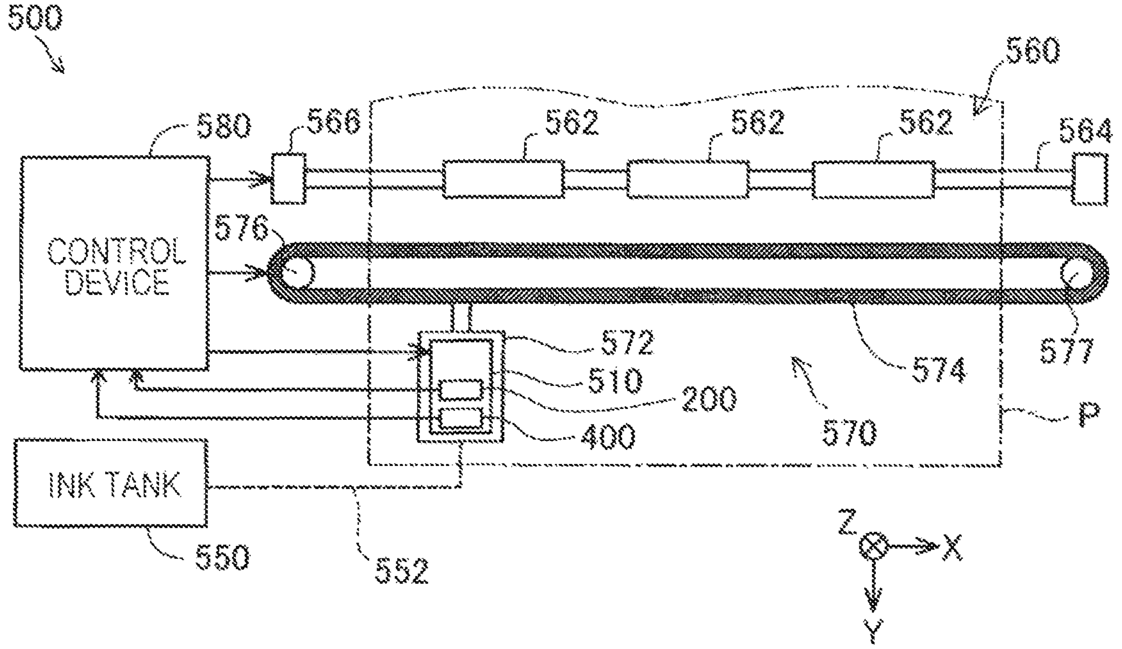
FIG. 1 is an explanatory diagram illustrating a schematic configuration of a liquid ejecting apparatus according to a first embodiment.

FIG. 1 is an explanatory diagram illustrating a schematic configuration of a liquid ejecting apparatus 500 as a first embodiment of the present disclosure. In the present embodiment, the liquid ejecting apparatus 500 is an ink jet printer that forms an image by ejecting ink as an example of a liquid onto printing paper P. The liquid ejecting apparatus 500 may use any kind of medium, such as a resin film or a cloth, as a target on which ink is to be ejected, instead of the printing paper P. X, Y, and Z illustrated in FIG. 1 and each of the drawings subsequent to FIG. 1 represent three spatial axes orthogonal to each other. In the present specification, directions along the axes are also referred to as an X-axis direction, a Y-axis direction, and a Z-axis direction. When specifying the direction, a positive direction is "+" and a negative direction is "−" so that positive and negative signs are used together in the direction notation, and description will be given when a direction to which an arrow faces in each of the drawings is the + direction and an opposite direction thereof is the − direction. In the present embodiment, the Z-axis direction coincides with a vertical direction, the +Z direction indicates vertically downward, and the −Z direction indicates vertically upward. Further, when the positive direction and the negative direction are not limited, the three X, Y, and Z will be described as the X-axis, the Y-axis, and the Z-axis.

The liquid ejecting apparatus 500 includes a liquid ejecting head 510, an ink tank 550, a transport mechanism 560, a moving mechanism 570, and a control device 580. The liquid ejecting head 510 is configured with a plurality of nozzles, ejects inks of a total of four colors, for example, black, cyan, magenta, and yellow in the +Z direction to form an image on a printing paper P. The liquid ejecting head 510 is mounted on a carriage 572 and reciprocates in main scanning directions with the movement of the carriage 572. In the present embodiment, the main scanning directions are the +X direction and the −X direction. The liquid ejecting head 510 may further eject ink of a random color such as light cyan, light magenta, or white and transparent ink, in addition to the four colors.

The ink tank 550 accommodates the ink to be ejected to the liquid ejecting head 510. The ink tank 550 is coupled to the liquid ejecting head 510 by a resin tube 552. The ink in the ink tank 550 is supplied to the liquid ejecting head 510 via the tube 552. Instead of the ink tank 550, a bag-shaped liquid pack formed of a flexible film may be provided.

The transport mechanism 560 transports the printing paper P in a sub-scanning direction. The sub-scanning direction is a direction that intersects with the X-axis direction, which is a main scanning direction, and is the +Y direction and the −Y direction in the present embodiment. The transport mechanism 560 includes a transport rod 564, on which three transport rollers 562 are mounted, and a transport motor 566 for rotatably driving the transport rod 564. When the transport motor 566 rotatably drives the transport rod 564, the printing paper P is transported in the +Y direction, which is the sub-scanning direction. The number of the transport rollers 562 is not limited to three and may be a random number. Further, a configuration in which a plurality of transport mechanisms 560 are provided may be provided.

The moving mechanism 570 includes a carriage 572, a transport belt 574, a moving motor 576, and a pulley 577. The carriage 572 mounts the liquid ejecting head 510 in a state where the ink can be ejected. The carriage 572 is fixed to the transport belt 574. The transport belt 574 is bridged between the moving motor 576 and the pulley 577. When the moving motor 576 is rotatably driven, the transport belt 574 reciprocates in the main scanning direction. Thereby, the carriage 572 fixed to the transport belt 574 also reciprocates in the main scanning direction.

Figure 2:
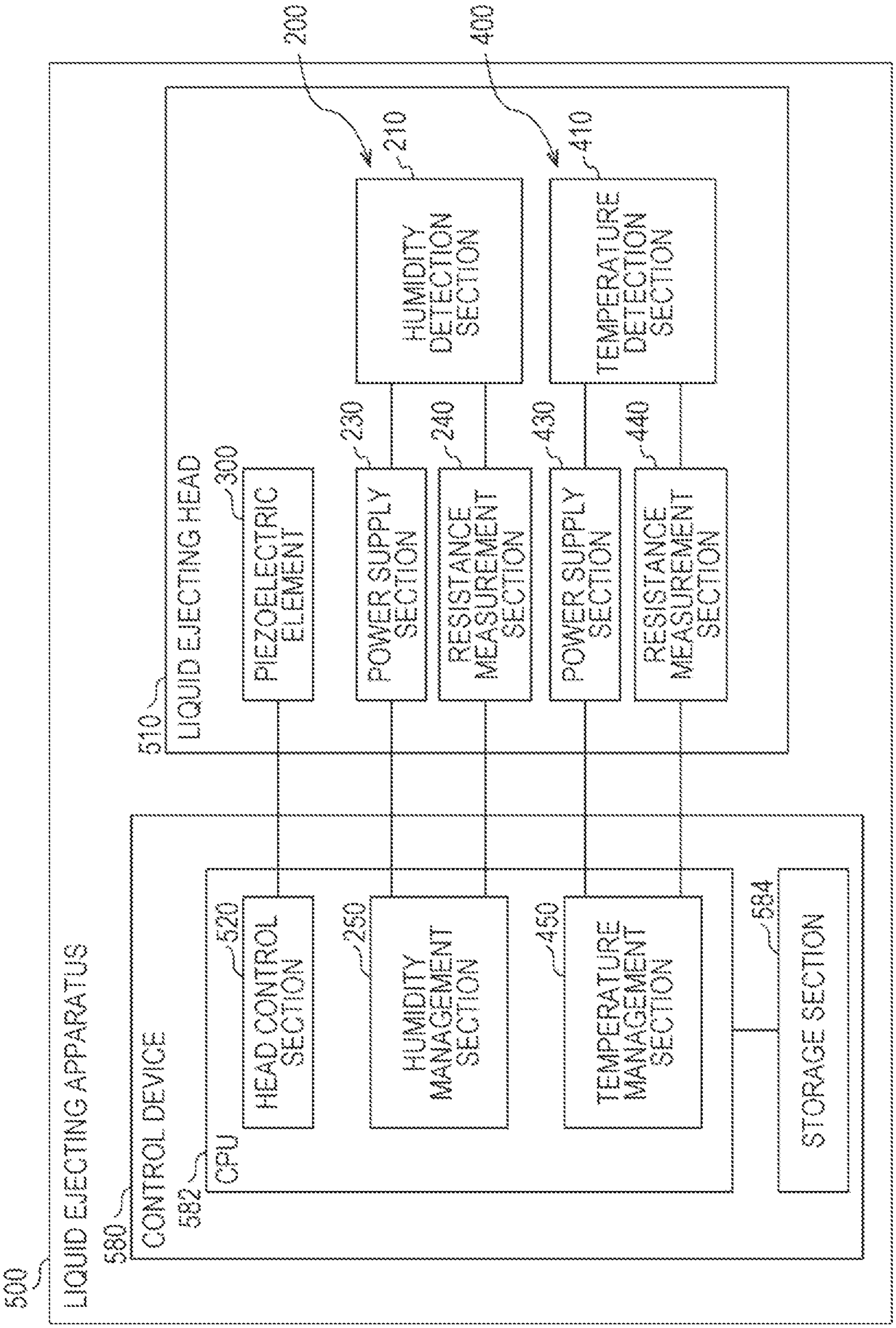
FIG. 2 is a block diagram illustrating a functional configuration of the liquid ejecting apparatus.

FIG. 2 is a block diagram illustrating a functional configuration of the liquid ejecting apparatus 500. In FIG. 2, a partial configuration of the liquid ejecting apparatus 500 such as the ink tank 550, the transport mechanism 560, and the moving mechanism 570 is omitted. As illustrated in FIG. 2, the liquid ejecting head 510 includes a piezoelectric element 300, a humidity detection mechanism 200, and a temperature detection mechanism 400.

The piezoelectric element 300 is a drive element that causes a pressure change in the ink in a pressure chamber of the liquid ejecting head 510. The humidity detection mechanism 200 functions as a so-called electric humidity sensor, and acquires information on humidity in a member included in the liquid ejecting head 510, such as the piezoelectric element 300, or a member on the periphery of the humidity detection mechanism 200. "Information on humidity" includes, for example, an amount of moisture absorbed or dehumidified from a member, relative humidity and absolute humidity which indicate an amount of moisture contained in the air, a degree of an influence on performance of a member because of moisture absorption or dehumidification, and information used to acquire such information, such as a resistance value or a capacitance value. The "degree of an influence on performance of a member" may include the presence or absence of a failure of the member, a temporal change in the performance of the member, and the like.

As illustrated in FIG. 2, the humidity detection mechanism 200 includes a humidity detection section 210, a humidity-detection power supply section 230, and a humidity-detection resistance measurement section 240. In the present embodiment, the humidity detection section 210 is configured with a resistance-detection-type humidity sensor, and uses a property that conductivity of a measurement target changes with moisture absorption. The humidity-detection power supply section 230 is, for example, a constant current circuit, and causes a predetermined current to flow through the humidity detection section 210 under a control of a humidity management section 250. The humidity-detection resistance measurement section 240 detects a resistance value of the humidity detection section 210 based on a current value of a current flowing through the humidity detection section 210 by the humidity-detection power supply section 230 and a voltage value of a voltage generated in the humidity detection section 210. A detection result by the humidity-detection resistance measurement section 240 is output to the humidity management section 250. The humidity-detection power supply section 230 may be a circuit that applies a predetermined voltage to the humidity detection section 210. The humidity-detection power supply section 230 and the humidity-detection resistance measurement section 240 may be provided in the control device 580.

The temperature detection mechanism 400 functions as a temperature sensor that detects a temperature of the ink in a pressure chamber to be described later. Specifically, the temperature detection mechanism 400 detects a temperature of a resistance wiring by using a characteristic that a resistance value of a resistance wiring of a metal, a semiconductor, or the like changes depending on a temperature, and estimates the detected temperature of the resistance wiring as a temperature of the ink in the pressure chamber.

The temperature detection mechanism 400 includes a temperature detection section 410, a temperature-detection power supply section 430, and a temperature-detection resistance measurement section 440. The temperature detection section 410 is configured with a conductor wiring including a resistor for temperature detection. The temperature-detection power supply section 430 is, for example, a constant current circuit, and causes a predetermined current to flow through the temperature detection section 410 under a control of a temperature management section 450. The temperature-detection resistance measurement section 440 acquires a resistance value of a temperature detection resistor of the temperature detection section 410 based on a current value of a current flowing through the temperature detection section 410 by the temperature-detection power supply section 430 and a voltage value of a voltage generated in the temperature detection section 410. A detection result by the temperature-detection resistance measurement section 440 is output to the temperature management section 450.

As illustrated in FIG. 2, the control device 580 is configured as a microcomputer including a CPU 582 and a storage section 584. The control device 580 is mounted on, for example, a wiring substrate 120 or a circuit substrate directly or indirectly coupled to the wiring substrate 120. As the storage section 584, for example, a non-volatile memory such as EEPROM in which data can be erased by an electrical signal, a non-volatile memory such as One-Time-PROM or EPROM in which data can be erased by ultraviolet rays, a non-volatile memory such as PROM in which data cannot be erased, and the like can be used. The storage section 584 stores various programs for realizing functions provided in the present embodiment. The CPU 582 functions as a head control section 520, a humidity management section 250, and a temperature management section 450 by developing and executing a program stored in the storage section 584. The control device 580 may further include a communication section for transmitting and receiving a humidity detection result or a temperature detection result to and from a predetermined server.

The head control section 520 collectively performs a control of each section of the liquid ejecting head 510, such as an ejecting operation. The head control section 520 may control, for example, a reciprocating operation of the carriage 572 along the main scanning direction, and a transport operation of the printing paper P along the sub-scanning direction, in addition to the control of the liquid ejecting head 510. As an ejecting operation of the liquid ejecting head 510, the head control section 520 can control ejection of the ink onto the printing paper P by, for example, outputting a drive signal to the liquid ejecting head 510 to drive the piezoelectric element 300, the drive signal being a signal based on the temperature of the ink in the pressure chamber that is acquired from the temperature management section 450.

The humidity management section 250 derives information on humidity as a detection target by using the resistance value of the humidity detection section 210 that is acquired from the humidity-detection resistance measurement section 240 and a humidity calculation equation stored in the storage section 584 in advance. The humidity calculation equation indicates a correspondence relationship between the resistance value of the detection target and the humidity. Instead of the humidity calculation equation, a conversion table indicating a correspondence relationship between the resistance value of the detection target and the humidity may be used. Further, the storage section 584 may store a correspondence relationship between the resistance value of the detection target and the temporal change in the performance of the detection target. The circuit included in the humidity management section 250 can be disposed on, for example, the wiring substrate 120. Thereby, an increase in the size of the liquid ejecting head 510 can be suppressed.

The temperature management section 450 derives the temperature of the ink in the pressure chamber 12 by using the resistance value of the temperature detection resistor of the temperature detection section 410 that is acquired from the temperature-detection resistance measurement section 440 and a temperature calculation equation stored in the storage section 584 in advance. The temperature calculation equation indicates a correspondence relationship between the resistance value of the temperature detection resistor and the temperature. Instead of the temperature calculation equation, a conversion table indicating a correspondence relationship between the resistance value of the temperature detection resistor and the temperature may be used. The temperature management section 450 outputs the derived temperature of the ink in the pressure chamber 12 to the head control section 520.

Figure 3:
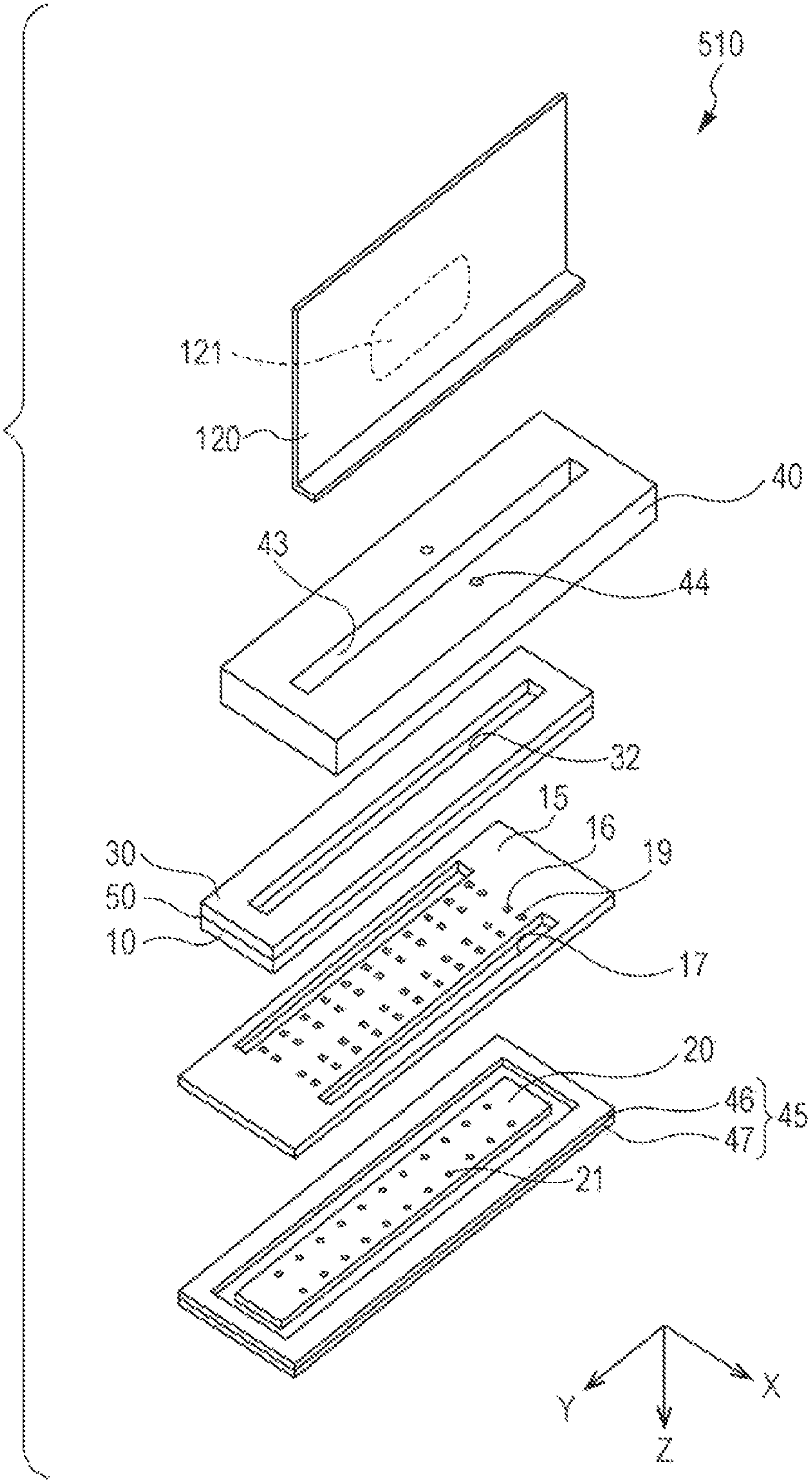
FIG. 3 is an exploded perspective view illustrating a configuration of a liquid ejecting head.
Figure 4:
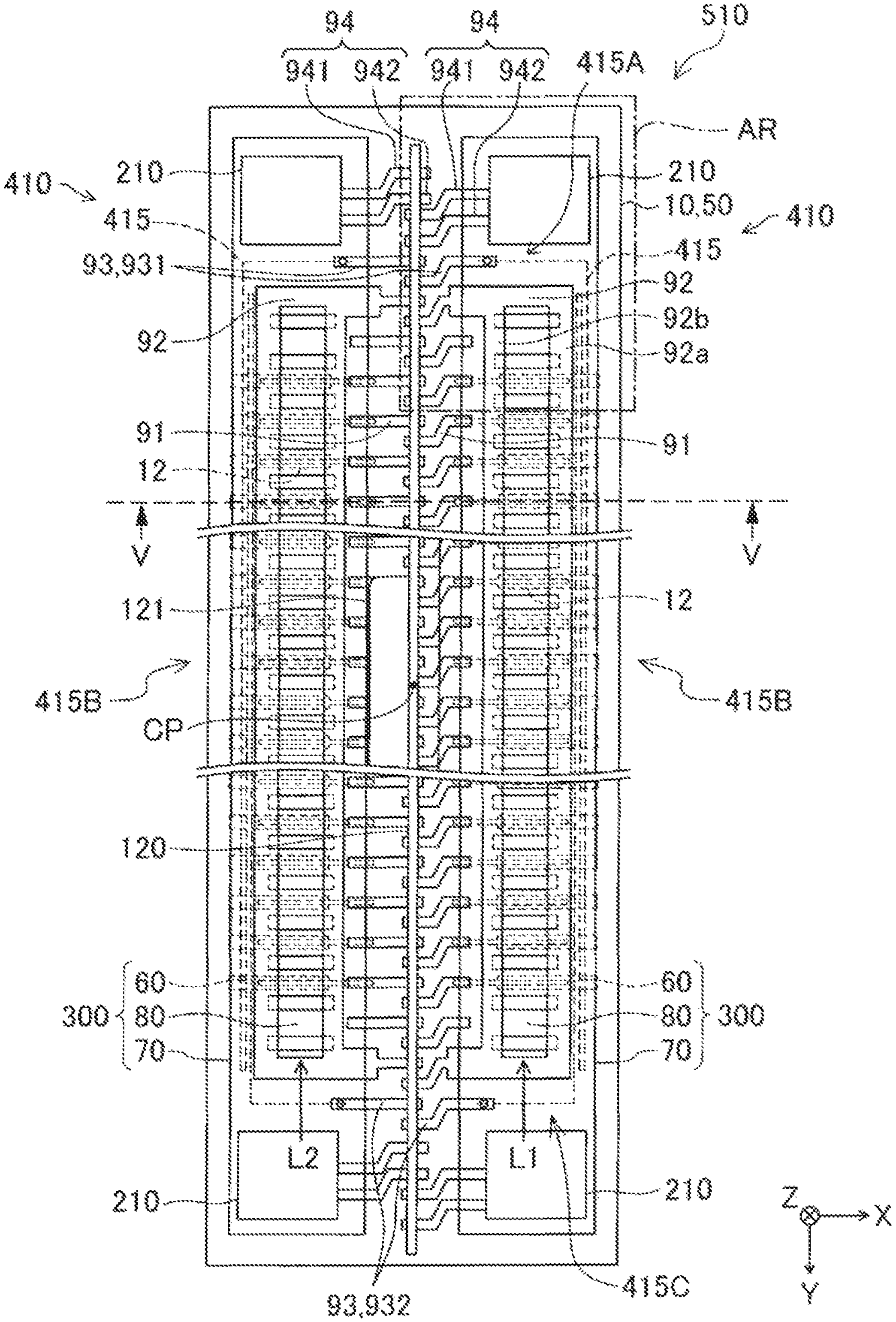
FIG. 4 is an explanatory diagram illustrating a configuration of the liquid ejecting head in plan view.
Figure 5:
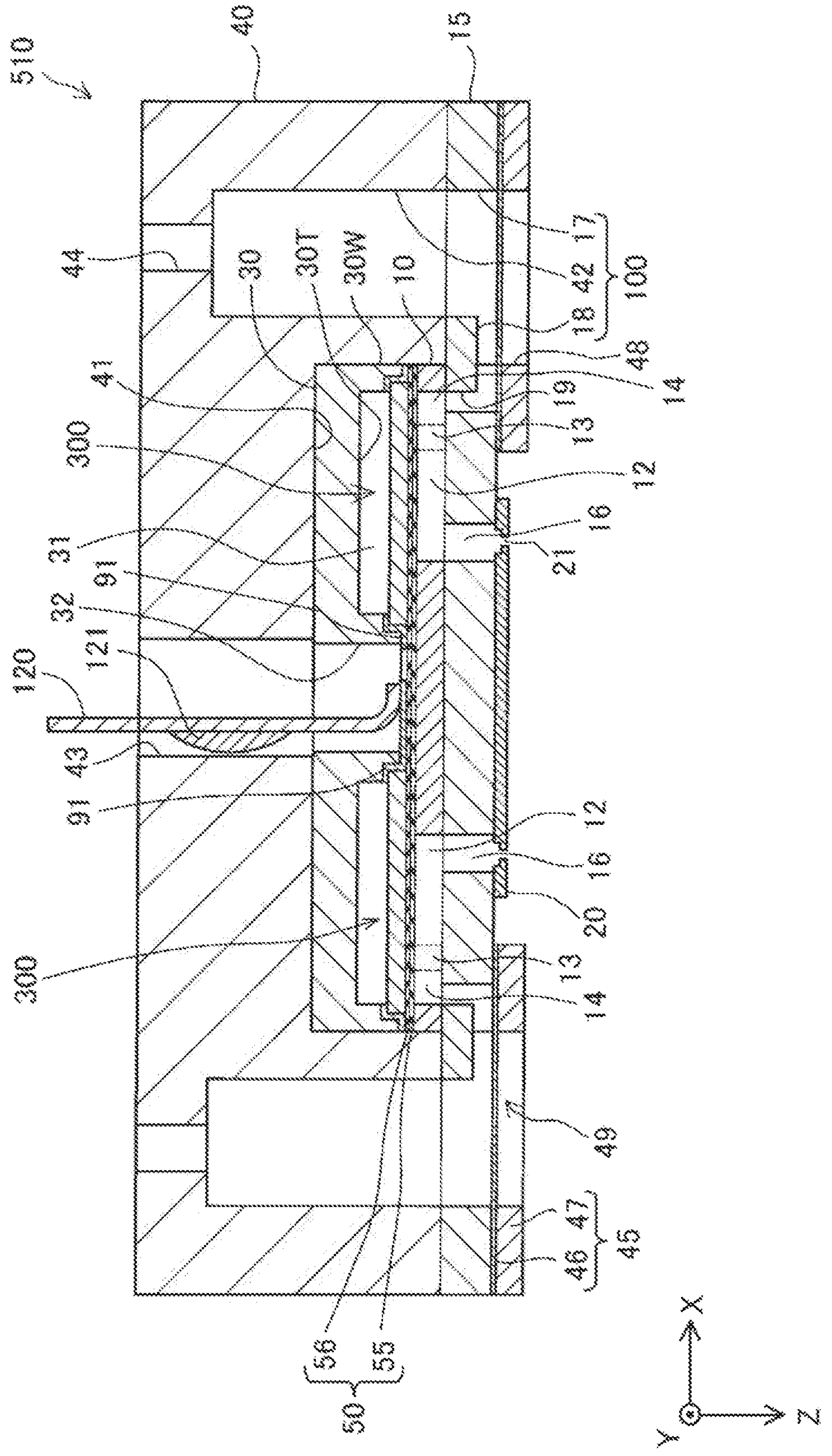
FIG. 5 is a cross-sectional view illustrating a V-V position of FIG. 4.

A detailed configuration of the liquid ejecting head 510 will be described with reference to FIG. 3 to FIG. 5. FIG. 3 is an exploded perspective view illustrating the configuration of the liquid ejecting head 510. FIG. 4 is an explanatory diagram illustrating the configuration of the liquid ejecting head 510 in plan view. In the present disclosure, the "plan view" means a state in which an object is viewed along a lamination direction to be described later. FIG. 4 illustrates the configuration around a pressure chamber substrate 10 and a vibration plate 50 in the liquid ejecting head 510. In order to facilitate understanding of the technique, a protective film 82, a sealing substrate 30, a case member 40, and the like are not illustrated. FIG. 5 is a cross-sectional view illustrating a V-V position of FIG. 4.

The liquid ejecting head 510 includes a pressure chamber substrate 10, a communication plate 15, a nozzle plate 20, a compliance substrate 45, a vibration plate 50, a sealing substrate 30, a case member 40, a wiring substrate 120, which are illustrated in FIG. 3, and a piezoelectric element 300 illustrated in FIG. 4. The liquid ejecting head 510 is configured by laminating these laminated members. In the present disclosure, a direction in which the laminated members of the liquid ejecting head 510 are laminated is also referred to as a "lamination direction". In the present embodiment, the lamination direction coincides with the Z-axis direction. In the present disclosure, the +Z direction side with respect to a predetermined reference position is also referred to as "one side of the lamination direction" or "lower side", and the −Z direction side with respect to a predetermined reference position is also referred to as "the other side of the lamination direction" or "upper side".

The pressure chamber substrate 10 is configured by using, for example, a silicon substrate, a glass substrate, an SOI substrate, various ceramic substrates, and the like. As illustrated in FIG. 4, a plurality of pressure chambers 12 are provided on the pressure chamber substrate 10. An ink flow path provided on the pressure chamber substrate 10, such as the pressure chamber 12, is formed by anisotropically etching the pressure chamber substrate 10 from the surface on the +Z direction side. The pressure chamber 12 is formed in a substantially rectangular shape in which a length in the X-axis direction is longer than a length in the Y-axis direction in plan view. On the other hand, the shape of the pressure chamber 12 is not limited to the rectangular shape, and may be a parallelogram shape, a polygonal shape, a circular shape, an oval shape, or the like. The oval shape means a shape in which both end portions in a longitudinal direction are semicircular based on a rectangular shape, and includes a rounded rectangular shape, an elliptical shape, an egg shape, and the like.

As illustrated in FIG. 4, a plurality of pressure chambers 12 are arranged along a predetermined direction in the pressure chamber substrate 10. In plan view of the liquid ejecting head 510 along the lamination direction, a direction in which the plurality of pressure chambers 12 are arranged is also referred to as an "arrangement direction". In the present embodiment, the plurality of pressure chambers 12 are arranged in two rows parallel to each other with the Y-axis direction as the arrangement direction. In the example of FIG. 4, the pressure chamber substrate 10 is provided with two pressure chamber rows, that is, a first pressure chamber row L1 having a first arrangement direction parallel to the Y-axis direction and a second pressure chamber row L2 having a second arrangement direction parallel to the Y-axis direction. The first pressure chamber row L1 and the second pressure chamber row L2 are disposed on both sides with the wiring substrate 120 interposed therebetween. Specifically, the second pressure chamber row L2 is disposed on the opposite side of the first pressure chamber row L1 with the wiring substrate 120 interposed therebetween in the direction that intersects with the arrangement direction of the first pressure chamber row L1. The direction orthogonal to both the arrangement direction and the lamination direction is also referred to as an "intersection direction". In the example of FIG. 4, the intersection direction is the X-axis direction, and the second pressure chamber row L2 is disposed in the −X direction with respect to the first pressure chamber row L1 with the wiring substrate 120 interposed between the first pressure chamber row L1 and the second pressure chamber row L2. In the plurality of pressure chambers 12, all the pressure chambers 12 do not necessarily have to be arranged in a straight line. For example, the plurality of pressure chambers 12 may be arranged along the Y-axis direction according to so-called staggered arrangement in which every other pressure chamber 12 is alternately disposed in the intersection direction.

As illustrated in FIG. 3, the communication plate 15, the nozzle plate 20, and the compliance substrate 45 are laminated on the +Z direction side of the pressure chamber substrate 10. The communication plate 15 is, for example, a flat plate member using a silicon substrate, a glass substrate, an SOI substrate, various ceramic substrates, a metal substrate, or the like. Examples of the metal substrate include a stainless steel substrate or the like. The communication plate 15 is provided with a nozzle communication path 16, a first manifold portion 17, a second manifold portion 18 illustrated in FIG. 5, and a supply communication path 19. Preferably, the communication plate 15 is formed by using a material having a thermal expansion coefficient substantially the same as a thermal expansion coefficient of the pressure chamber substrate 10. Thereby, when the temperatures of the pressure chamber substrate 10 and the communication plate 15 change, warpage of the pressure chamber substrate 10 and the communication plate 15 because of a difference in the thermal expansion coefficient can be suppressed.

As illustrated in FIG. 5, the nozzle communication path 16 is a flow path that communicates the pressure chamber 12 and a nozzle 21. The first manifold portion 17 and the second manifold portion 18 function as a part of a manifold 100 which is a common liquid chamber in which a plurality of pressure chambers 12 communicate with each other. The first manifold portion 17 is provided to penetrate the communication plate 15 in the Z-axis direction. Further, as illustrated in FIG. 5, the second manifold portion 18 is provided on a surface of the communication plate 15 on the +Z direction side without penetrating the communication plate 15 in the Z-axis direction.

As illustrated in FIG. 5, the supply communication path 19 is a flow path coupled to a pressure chamber supply path 14 provided on the pressure chamber substrate 10. The pressure chamber supply path 14 is a flow path coupled to one end portion of the pressure chamber 12 in the X-axis direction via a throttle portion 13. The throttle portion 13 is a flow path provided between the pressure chamber 12 and the pressure chamber supply path 14. The throttle portion 13 is a flow path in which an inner wall protrudes from the pressure chamber 12 and the pressure chamber supply path 14 and which is formed narrower than the pressure chamber 12 and the pressure chamber supply path 14. Thereby, the throttle portion 13 is set such that the flow path resistance is higher than those of the pressure chamber 12 and the pressure chamber supply path 14. With the configuration, even when pressure is applied to the pressure chamber 12 by the piezoelectric element 300 when the ink is ejected, the ink in the pressure chamber 12 can be suppressed or prevented from flowing back to the pressure chamber supply path 14. A plurality of supply communication paths 19 are arranged along the Y-axis direction, that is, the arrangement direction, and are individually provided for each of the pressure chambers 12. The supply communication path 19 and the pressure chamber supply path 14 communicate the second manifold portion 18 with each pressure chamber 12, and supply the ink in the manifold 100 to each pressure chamber 12.

The nozzle plate 20 is provided on a side opposite to the pressure chamber substrate 10, that is, on a surface of the communication plate 15 on the +Z direction side with the communication plate 15 interposed between the nozzle plate 20 and the pressure chamber substrate 10. A material of the nozzle plate 20 is not particularly limited, and for example, a silicon substrate, a glass substrate, an SOI substrate, various ceramic substrates, and a metal substrate can be used. Examples of the metal substrate include a stainless steel substrate or the like. As the material of the nozzle plate 20, an organic substance, such as a polyimide resin, can also be used. On the other hand, it is preferable to use a material for the nozzle plate 20 that has substantially the same thermal expansion coefficient as the thermal expansion coefficient of the communication plate 15. Thereby, when the temperatures of the nozzle plate 20 and the communication plate 15 change, warpage of the nozzle plate 20 and the communication plate 15 because of the difference in the thermal expansion coefficient can be suppressed.

A plurality of nozzles 21 are provided on the nozzle plate 20. Each nozzle 21 communicates with each pressure chamber 12 via the nozzle communication path 16. As illustrated in FIG. 3, the plurality of nozzles 21 are arranged along the arrangement direction of the pressure chambers 12, that is, the Y-axis direction. The nozzle plate 20 is provided with two nozzle rows in which the plurality of nozzles 21 are arranged in a row. The two nozzle rows respectively correspond to the first pressure chamber row L1 and the second pressure chamber row L2.

As illustrated in FIG. 5, the compliance substrate 45 is provided together with the nozzle plate 20 on the side opposite to the pressure chamber substrate 10 with the communication plate 15 interposed therebetween, that is, on a surface of the communication plate 15 on the +Z direction side. The compliance substrate 45 is provided on the periphery of the nozzle plate 20, and covers openings of the first manifold portion 17 and the second manifold portion 18 provided in the communication plate 15. The compliance substrate 45 includes, for example, a sealing film 46 made of a flexible thin film and a fixed substrate 47 made of a hard material such as a metal. As illustrated in FIG. 5, a region of the fixed substrate 47 facing the manifold 100 is completely removed in a thickness direction, and thus an opening portion 48 is defined. Therefore, one surface of the manifold 100 is a compliance portion 49 sealed only by the sealing film 46.

As illustrated in FIG. 5, the vibration plate 50 and the piezoelectric element 300 are laminated on a side opposite to the communication plate 15 or the like, that is, on a surface of the pressure chamber substrate 10 on the −Z direction side with the pressure chamber substrate 10 interposed therebetween. The piezoelectric element 300 bends and deforms the vibration plate 50 to cause a pressure change in the ink in the pressure chamber 12. In FIG. 5, illustration of the piezoelectric element 300 is simplified.

The vibration plate 50 is provided between the piezoelectric element 300 and the pressure chamber substrate 10. The vibration plate 50 is provided at a position closer to the pressure chamber substrate 10 side than the piezoelectric element 300, and includes an elastic film 55 containing silicon oxide ($SiO_2$) and an insulator film 56 that is provided on the elastic film 55 and contains a zirconium oxide film ($ZrO_2$). The elastic film 55 constitutes a surface of the flow path, such as the pressure chamber 12, on the −Z direction side. The vibration plate 50 may be configured with, for example, either the elastic film 55 or the insulator film 56, and may further include another film other than the elastic film 55 and the insulator film 56. Examples of the material of the other film include silicon, silicon nitride, and the like.

As illustrated in FIG. 3, the sealing substrate 30 having substantially the same size as the pressure chamber substrate 10 in plan view is further bonded to the surface of the pressure chamber substrate 10 on the −Z direction side by an adhesive or the like. The sealing substrate 30 may be bonded to a protective film 82 to be described later by an adhesive. As illustrated in FIG. 5, the sealing substrate 30 includes a ceiling portion 30T, a wall portion 30W, a holding portion 31, and a through hole 32. The holding portion 31 is a space defined by the ceiling portion 30T and the wall portion 30W, and protects an active portion of the piezoelectric element 300 by accommodating the piezoelectric element 300. In the present embodiment, the holding portions 31 are provided for each row of the piezoelectric elements 300. More specifically, two holding portions 31 corresponding to the first pressure chamber row L1 and the second pressure chamber row L2 are formed to be adjacent to each other. The through hole 32 penetrates the sealing substrate 30 along the Z-axis direction. The through hole 32 is disposed between the two holding portions 31 in plan view, and is formed in a long rectangular shape along the Y-axis direction.

As illustrated in FIG. 5, the case member 40 is fixed on the sealing substrate 30. The case member 40 forms the manifold 100 that communicates with the plurality of pressure chambers 12, together with the communication plate 15. The case member 40 has substantially the same outer shape as the communication plate 15 in plan view, and is bonded to cover the sealing substrate 30 and the communication plate 15.

The case member 40 includes an accommodation section 41, a supply port 44, a third manifold portion 42, and a coupling port 43. The accommodation section 41 is a space having a depth in which the pressure chamber substrate 10, the vibration plate 50, and the sealing substrate 30 can be accommodated. The third manifold portion 42 is a space provided in the vicinity of both ends of the accommodation section 41 in the X-axis direction in the case member 40. The manifold 100 is formed by coupling the third manifold portion 42 to the first manifold portion 17 and the second manifold portion 18 provided in the communication plate 15. The manifold 100 has a long shape in the Y-axis direction. The supply port 44 communicates with the manifold 100 to supply ink to each manifold 100. The coupling port 43 is a through hole that communicates with the through hole 32 of the sealing substrate 30, and the wiring substrate 120 is inserted to the coupling port 43.

In the liquid ejecting head 510, the ink supplied from the ink tank 550 illustrated in FIG. 1 is taken from the supply port 44 illustrated in FIG. 5, and an internal flow path from the manifold 100 to the nozzle 21 is filled with ink. Thereafter, a voltage based on the drive signal is applied to each of the piezoelectric elements 300 corresponding to the plurality of pressure chambers 12. Thereby, the vibration plate 50 bends and deforms together with the piezoelectric element 300, and thus the internal pressure of each pressure chamber 12 increases because of a change in volume of each pressure chamber 12. Therefore, ink droplets are ejected from each nozzle 21.

Figure 6:
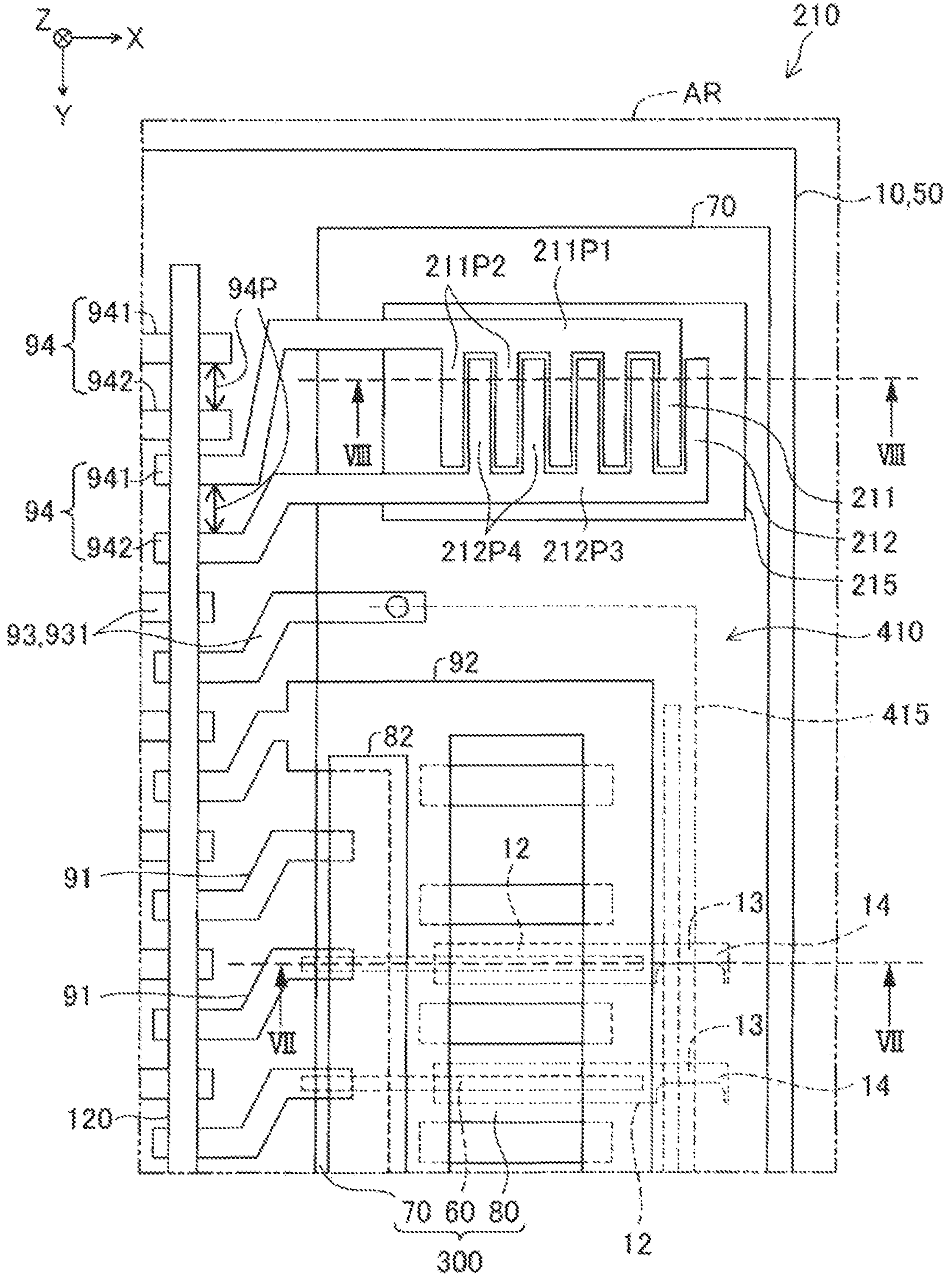
FIG. 6 is an enlarged explanatory diagram illustrating a partial range of FIG. 4.
Figure 7:
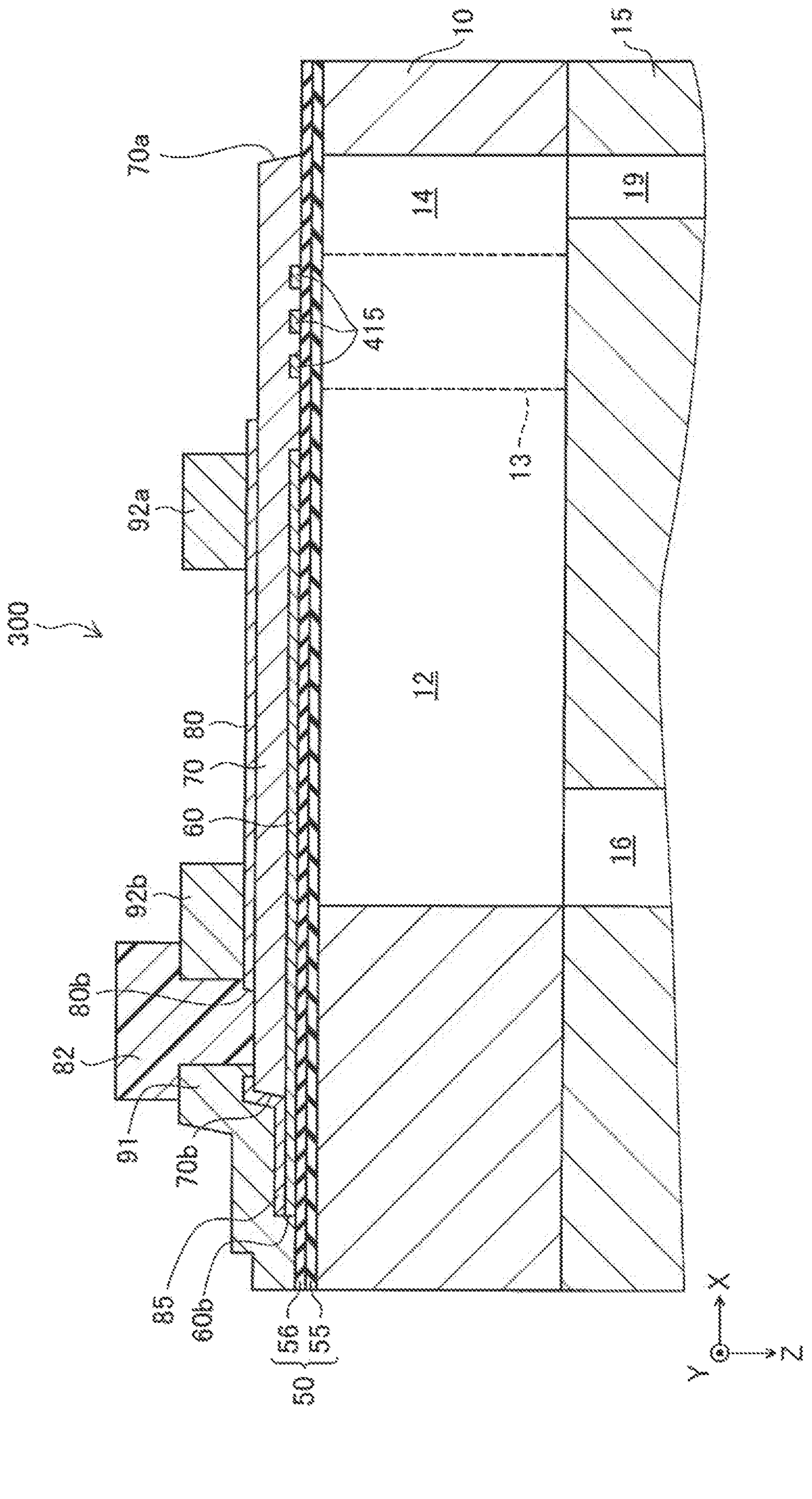
FIG. 7 is a cross-sectional view illustrating a VII-VII position of FIG. 6.

Configurations of the piezoelectric element 300, the humidity detection section 210, and the temperature detection section 410 will be described with reference to FIG. 6 to FIG. 8 as appropriate together with reference to FIG. 4 and FIG. 5. FIG. 6 is an enlarged explanatory diagram illustrating a partial range AR of FIG. 4. FIG. 7 is a cross-sectional view illustrating a VII-VII position of FIG. 6.

As illustrated in FIG. 7, the piezoelectric element 300 includes a first drive electrode 60, a piezoelectric body 70, and a second drive electrode 80. The first drive electrode 60, the piezoelectric body 70, and the second drive electrode 80 are laminated in this order in the −Z direction of the lamination direction. The piezoelectric body 70 is provided between the first drive electrode 60 and the second drive electrode 80 in the lamination direction.

As illustrated in FIG. 6, the first drive electrode 60 and the second drive electrode 80 are electrically coupled to the wiring substrate 120 illustrated in FIG. 5 via drive wirings. The drive wirings include a first drive wiring 91 that electrically couples the wiring substrate 120 and the first drive electrode 60 and a second drive wiring 92 that electrically couples the wiring substrate 120 and the second drive electrode 80. The first drive electrode 60 and the second drive electrode 80 apply a voltage according to the drive signal to the piezoelectric body 70. The drive voltage is a voltage applied to the piezoelectric element 300 from the first drive electrode 60 and the second drive electrode 80 to drive the piezoelectric element 300 by the head control section 520. When a voltage is applied between the first drive electrode 60 and the second drive electrode 80, a part, at which piezoelectric distortion occurs in the piezoelectric body 70, in the piezoelectric element 300 is also referred to as an active portion.

A different drive voltage is applied to the first drive electrode 60 according to an ejection amount of ink, and a predetermined reference voltage is applied to the second drive electrode 80 regardless of the ejection amount of ink. When a voltage difference occurs between the first drive electrode 60 and the second drive electrode 80 because of the application of the drive voltage and the reference voltage, the piezoelectric body 70 of the piezoelectric element 300 is deformed. Because of the deformation of the piezoelectric body 70, the vibration plate 50 is deformed or vibrated, and thus the volume of the pressure chamber 12 changes. Because of the change in the volume of the pressure chamber 12, pressure is applied to the ink accommodated in the pressure chamber 12, and thus the ink is ejected from the nozzle 21 via the nozzle communication path 16.

In the present embodiment, the first drive electrode 60 is an individual electrode individually provided for the plurality of pressure chambers 12. As illustrated in FIG. 7, the first drive electrode 60 is a lower electrode provided on a side opposite to the second drive electrode 80 with the piezoelectric body 70 interposed therebetween, that is, on a lower side of the piezoelectric body 70. A thickness of the first drive electrode 60 is formed to be, for example, approximately 80 nanometers. For example, the first drive electrode 60 is formed of a conductive material including a metal, such as platinum (Pt), iridium (Ir), gold (Au), titanium (Ti), and a conductive metal oxide such as indium tin oxide abbreviated as ITO. The first drive electrode 60 may be formed by laminating a plurality of materials such as platinum (Pt), iridium (Ir), gold (Au), and titanium (Ti). In the present embodiment, platinum (Pt) is used as the first drive electrode 60.

As illustrated in FIG. 4, the piezoelectric body 70 has a predetermined width in the X-axis direction, and has a long rectangular shape along the arrangement direction of the pressure chambers 12, that is, the Y-axis direction. The thickness of the piezoelectric body 70 is formed, for example, from approximately 1000 nanometers to 4000 nanometers. Examples of the piezoelectric body 70 include a crystal film having a perovskite structure provided on the first drive electrode 60 and made of a ferroelectric ceramic material exhibiting an electromechanical conversion action, that is, a so-called perovskite type crystal. As the material of the piezoelectric body 70, for example, a ferroelectric piezoelectric material such as lead zirconate titanate (PZT) or a material to which a metal oxide, such as niobium oxide, nickel oxide, or magnesium oxide, is added can be used. Specifically, lead titanate ($PbTiO_3$), lead zirconate titanate ($Pb(Zr,Ti)O_3$), lead zirconate ($PbZrO_3$), lead lanthanum titanate ($(Pb,La),TiO_3$), lead lanthanum zirconate titanate ($(Pb,La)(Zr,Ti)O_3$), lead magnesium niobate zirconate ($Pb(Zr,Ti)(Mg,Nb)O_3$), or the like can be used. In the present embodiment, lead zirconate titanate (PZT) is used as the piezoelectric body 70.

The material of the piezoelectric body 70 is not limited to the lead-based piezoelectric material containing lead, and a non-lead-based piezoelectric material containing no lead can also be used. Examples of the non-lead-based piezoelectric material include bismuth iron acid (($BiFeO_3$), abbreviated to "BFO"), barium titanate (($BaTiO_3$), abbreviated to "BT"), potassium sodium niobate ($(K,Na)$ ($NbO_3$), abbreviated to "KNN"), potassium sodium lithium niobate ($(K,Na,Li)$ ($NbO_3$)), potassium sodium lithium tantalate niobate ($(K,Na,Li)$ (Nb, Ta) $O_3$), bismuth potassium titanate ($(Bi_{1/2}K_{1/2})TiO_3$, abbreviated to "BKT"), bismuth sodium titanate ($(Bi_{1/2}Na_{1/2})TiO_3$, abbreviated to "BNT"), bismuth manganate ($BiMnO_3$, abbreviated to "BM"), a composite oxide containing bismuth, potassium, titanium, and iron and having a perovskite structure ($x[(Bi_xK_{1-x})TiO_3]$-$(1-x)[BiFeO_3]$, abbreviated to "BKT-BF"), a composite oxide containing bismuth, iron, barium, and titanium and having a perovskite structure ($(1-x)$ $[BiFeO_3]-x[BaTio_3]$, abbreviated to "BFO-BT"), and a material ($(1-x)$ $[Bi(Fe_{1-y}M_y)O_3]-x[BaTiO_3]$, M being Mn, Co, or Cr), which is obtained by adding metals such as manganese, cobalt, and chromium to the composite oxide.

As illustrated in FIG. 4, the second drive electrode 80 is a common electrode that is commonly provided with respect to the plurality of pressure chambers 12. The second drive electrode 80 has a predetermined width in the X-axis direction, and is provided to extend along the arrangement direction of the pressure chambers 12, that is, the Y-axis direction. As illustrated in FIG. 7, the second drive electrode 80 is an upper electrode provided on a side opposite to the first drive electrode 60 with the piezoelectric body 70 interposed therebetween, that is, on an upper side of the piezoelectric body 70. As a material of the second drive electrode 80, similar to the first drive electrode 60, for example, metals, such as platinum (Pt), iridium (Ir), gold (Au), and titanium (Ti), and conductive materials including conductive metal oxides, such as indium tin oxide abbreviated as ITO, are used. The second drive electrode 80 may be formed by laminating a plurality of materials such as platinum (Pt), iridium (Ir), gold (Au), and titanium (Ti). In the present embodiment, iridium (Ir) is used as the second drive electrode 80.

As illustrated in FIG. 7, a protective film 82 is provided on an end portion **80*b* of the second drive electrode 80 on the −X direction side. As a material of the protective film 82, a material having an electrical insulating property and a moisture barrier property is used. For the protective film 82, for example, an oxide insulating film such as aluminum oxide or hafnia, a polymer material film such as polyimide, or the like can be adopted. When the protective film 82 is a photosensitive resin such as polyimide, a resist layer used in a manufacturing process can be used. When the protective film 82 is made of a resin material, the surface resistance easily changes depending on the humidity, and thus the protective film 82 can be suitably used as an interlayer 215. In the present embodiment, polyimide is used for the protective film 82**.

As illustrated in FIG. 6, the protective film 82 is disposed at a drive electrode end portion position that overlaps the end portion of the second drive electrode 80 in plan view of the liquid ejecting head 510, and is formed to cover the end portion **80*b* of the second drive electrode 80 and the surface of the piezoelectric body 70, as illustrated in FIG. 7. By covering the surface of the piezoelectric body 70 with the protective film 82, the piezoelectric body 70 can be protected from moisture in the outside air and the air. Therefore, the protective film 82 is preferably made of a material having low water vapor permeability. Further, by covering the end portion 80*b* with the protective film 82, peeling of the second drive electrode 80 from the end portion 80*b* can be suppressed or prevented. Further, by covering the end portion 80*b*, driving of the piezoelectric element 300 in the vicinity of the end portion of the active portion of the piezoelectric element 300 can be suppressed. As a result, for example, occurrence of a physical damage such as a crack in a member in the vicinity of the end portion of the active portion, such as a joint portion between the vibration plate 50 and the pressure chamber substrate 10 and the vibration plate 50, can be suppressed. For this reason, the protective film 82 is preferably made of, for example, a material having a high elastic modulus or a high Young's modulus. For example, the Young's modulus is preferably equal to or higher than 2 GPa from a viewpoint of suitable driving suppression. Further, the protective film 82 has an insulating property, and thus a progress of migration between wirings such as wirings between the end portion 80*b* and the first drive wiring 91 or the like can be suppressed or prevented. When the second drive electrode 80 is disposed on a lower side of the piezoelectric body 70 as a lower electrode and the first drive electrode 60 is disposed on an upper side of the piezoelectric body 70 as an upper electrode, the drive electrode end portion position means a position overlapping the end portion of the first drive electrode 60 on the −X direction side. On the other hand, the drive electrode end portion position is not limited to only the end portion of the first drive electrode 60 on the −X direction side, and may be set by using an end portion located in any direction of the first drive electrode 60 or the second drive electrode 80, or by using a plurality of end portions obtained by combining end portions of the first drive electrode 60 and the second drive electrode 80**.

As illustrated in FIG. 7, a wiring portion 85 is provided on the further −X direction side of the end portion **80*b* of the second drive electrode 80 in the −X direction. In FIG. 4 and FIG. 6, the wiring portion 85 is not illustrated. The wiring portion 85 is in the same layer as the second drive electrode 80, but is electrically discontinuous with the second drive electrode 80. The wiring portion 85 is formed from the end portion 70*b* of the piezoelectric body 70 in the −X direction to the end portion 60***b* of the first drive electrode 60 in the −X direction in a state of being spaced from the end portion 80*b* of the second drive electrode 80. The end portion 60*b* of the first drive electrode 60 in the −X direction is pulled out from the end portion 70*b* of the piezoelectric body 70 to the outside. The wiring portion 85 is provided for each piezoelectric element 300, and a plurality of wiring portions 85 are disposed at predetermined intervals along the Y-axis direction. Preferably, the wiring portion 85 is formed in the same layer as the second drive electrode 80. Thereby, a manufacturing process of the wiring portion 85 can be simplified and the cost can be reduced. Here, the wiring portion 85 may be formed in a layer different from the layer of the second drive electrode 80.

As illustrated in FIG. 6 and FIG. 7, the first drive wiring 91 is electrically coupled to the first drive electrode 60 which is an individual electrode, and an extension portion 92*a* and an extension portion 92*b* of the second drive wiring 92 are electrically coupled to the second drive electrode 80 which is a common electrode. The first drive wiring 91 and the second drive wiring 92 function as drive wirings for applying a voltage for driving the piezoelectric body 70 from the wiring substrate 120.

The materials of the first drive wiring 91 and the second drive wiring 92 are conductive materials. For example, gold (Au), copper (Cu), titanium (Ti), tungsten (W), nickel (Ni), chromium (Cr), platinum (Pt), aluminum (Al), and the like can be used. In the present embodiment, gold (Au) is used as the first drive wiring 91 and the second drive wiring 92. The first drive wiring 91 and the second drive wiring 92 are formed in the same layer in a state of being electrically discontinuous with each other. Thereby, a process of forming the first drive wiring 91 can be shared with a process of forming the second drive wiring 92. Therefore, as compared with when the first drive wiring 91 and the second drive wiring 92 are individually formed, the manufacturing process can be simplified and productivity of the liquid ejecting head 510 can be improved. Here, the first drive wiring 91 and the second drive wiring 92 may be formed in different layers from each other. The first drive wiring 91 and the second drive wiring 92 may include an adhesion layer for improving adhesion to the first drive electrode 60, the second drive electrode 80, and the vibration plate 50.

The first drive wiring 91 is individually provided for each first drive electrode 60. As illustrated in FIG. 7, the first drive wiring 91 is coupled to the vicinity of the end portion 60*b* of the first drive electrode 60 via the wiring portion 85, and is pulled out in the −X direction to reach a top of the vibration plate 50. The first drive wiring 91 is electrically coupled to the end portion 60*b* of the first drive electrode 60 in the −X direction, the end portion 60*b* being pulled out from the end portion 70*b* of the piezoelectric body 70 to the outside. The wiring portion 85 may be omitted, and the first drive wiring 91 may be directly coupled to the end portion 60*b* of the first drive electrode 60.

As illustrated in FIG. 4, the second drive wiring 92 extends along the Y-axis direction, bends at both ends in the Y-axis direction, and is pulled out along the X-axis direction. The second drive wiring 92 includes an extension portion 92*a* extending along the Y-axis direction and an extension portion 92*b*. As illustrated in FIG. 4 and FIG. 5, the end portions of the first drive wiring 91 and the second drive wiring 92 are extended so as to be exposed to the through hole 32 of the sealing substrate 30, and are electrically coupled to the wiring substrate 120 in the through hole 32.

The wiring substrate 120 is configured with, for example, a flexible printed circuit (FPC). The wiring substrate 120 is provided with a plurality of wirings for coupling to the control device 580 and a power supply circuit (not illustrated). In addition, the wiring substrate 120 may be configured with any flexible substrate, such as flexible flat cable (FFC), instead of FPC. An integrated circuit 121 including a switching element and the like is mounted at the wiring substrate 120. A command signal or the like for driving the piezoelectric element 300 is input to the integrated circuit 121. The integrated circuit 121 controls a timing at which a drive signal for driving the piezoelectric element 300 is supplied to the first drive electrode 60 based on the command signal. As illustrated in FIG. 6, the temperature detection section 410 includes a temperature detection resistor 415 and temperature detection wirings 93. The temperature detection resistor 415 is a resistance wiring used for detecting the temperature of the ink in the pressure chamber 12. The temperature detection wiring 93 electrically couples the wiring substrate 120 and the temperature detection resistor 415. More specifically, the temperature detection wirings 93 include a first temperature detection wiring 931 coupled to one end of the temperature detection resistor 415 and a second temperature detection wiring 932 coupled to the other end of the temperature detection resistor 415. The temperature detection wirings 93 are formed in the same layer as, for example, layers of the first drive wiring 91, the second drive wiring 92, and a humidity detection wiring 94 to be described later, and are formed so as to be electrically discontinuous with each other. An end portion of the temperature detection wiring 93 extends so as to be exposed to the through hole 32 of the sealing substrate 30, and is electrically coupled to the wiring substrate 120 in the through hole 32.

A material of the temperature detection resistor 415 is a material of which the resistance value is temperature dependent. For example, gold (Au), platinum (Pt), iridium (Ir), aluminum (Al), copper (Cu), titanium (Ti), tungsten (W), nickel (Ni), chromium (Cr), or the like can be used. Here, platinum (Pt) can be preferably used as a material of the temperature detection resistor 415 from a viewpoint that the change in resistance with temperature is large and stability and accuracy are high.

As illustrated in FIG. 7, the temperature detection resistor 415 is formed in the same layer as, for example, the layer of the first drive electrode 60 in the lamination direction, and is formed so as to be electrically discontinuous with the first drive electrode 60. In the present embodiment, the temperature detection resistor 415 is formed together with the first drive electrode 60 in a process of forming the first drive electrode 60. As a result, the temperature detection resistor 415 is formed of platinum (Pt), which is the same material as the first drive electrode 60, and a thickness of the temperature detection resistor 415 is approximately 80 nanometers similar to the first drive electrode 60. Here, the temperature detection resistor 415 is not limited thereto, may be individually formed separately from the process of forming the first drive electrode 60, or may be formed together with a conductor wiring different from the conductor wiring of the first drive electrode 60.

A material of the temperature detection wiring 93 is a conductive material. For example, gold (Au), copper (Cu), titanium (Ti), tungsten (W), nickel (Ni), chromium (Cr), platinum (Pt), aluminum (Al), and the like can be used. The material of the temperature detection wiring 93 is gold (Au) that is the same as the materials of the first drive wiring 91, the second drive wiring 92, and the humidity detection wiring 94 to be described later. Here, any material other than gold (Au) may be used for the temperature detection wiring

93, and the material may be different from the materials of the first drive wiring 91, the second drive wiring 92, and the humidity detection wiring 94.

As illustrated in FIG. 4, in the present embodiment, the temperature detection resistor 415 is continuously formed so as to surround the vicinities of the first pressure chamber row L1 and the second pressure chamber row L2 in plan view. More specifically, the temperature detection resistor 415 includes a first extension portion 415A electrically coupled to the first temperature detection wiring 931, a third extension portion 415C electrically coupled to the second temperature detection wiring 932, and second extension portions 415B between the first extension portion 415A and the third extension portion 415C. A region surrounded by the first extension portion 415A, the second extension portions 415B, and the third extension portion 415C is also referred to as a "temperature detection region". In the example of FIG. 4, there are two temperature detection regions, a first temperature detection region including the first pressure chamber row L1 and a second temperature detection region including the second pressure chamber row L2.

The first extension portion 415A extends along the X-axis direction, which is the intersection direction, on one side of the arrangement direction, specifically, on the −Y direction side with respect to the plurality of pressure chambers 12. The second extension portion 415B is further disposed on an outer side with respect to the first pressure chamber row L1 and the second pressure chamber row L2 in the liquid ejecting head 510, and extends along the Y-axis direction which is the arrangement direction. The third extension portion 415C extends along the X-axis direction, at a position on the other side of the arrangement direction, specifically, the +Y direction side with respect to the plurality of pressure chambers 12. In this way, the temperature detection resistor 415 is disposed so as to surround the vicinities of the first pressure chamber row L1 and the second pressure chamber row L2. By widening a region in which the temperature detection resistor 415 is disposed, the temperature of the entire ink of the liquid ejecting head 510 can be detected.

As illustrated in FIG. 6 and FIG. 7, the temperature detection resistor 415 is disposed so as to pass the vicinity of the ink flow path in the pressure chamber substrate 10. In the present embodiment, the second extension portion 415B of the temperature detection resistor 415 is disposed so as to pass the throttle portion 13 in the vicinity of each pressure chamber 12. In addition, as illustrated in FIG. 4, the second extension portion 415B is formed as a so-called zigzag pattern to be reciprocated a plurality of times along the arrangement direction. By lengthening a wiring length of the portion of the temperature detection resistor 415 that passes the vicinity of the pressure chamber 12 and is likely to contribute to the temperature detection of the ink, accuracy in detection of the temperature of the ink in the pressure chamber 12 can be improved. Here, the second extension portion 415B may be formed in any shape, may be formed, for example, in a zigzag pattern to be reciprocated a plurality of times along the intersection direction instead of the arrangement direction, or may be formed, for example, in any shape such as a linear shape or a wave shape instead of the zigzag pattern. Further, the disposition position of the temperature detection resistor 415 is not limited to the position on the throttle portion 13, and may be any position on the pressure chamber 12. When the temperature detection resistor 415 cannot be disposed on the pressure chamber 12, the temperature detection resistor 415 may be disposed at a position close to the pressure chamber 12.

As illustrated in FIG. 4, in plan view, the humidity detection sections 210 are disposed at total four positions including positions adjacent to both sides of the first pressure chamber row L1 along the first arrangement direction and positions adjacent to both sides of the second pressure chamber row L2 along the second arrangement direction. The humidity detection sections 210 are individually provided for each of the holding portions 31 of the sealing substrate 30 corresponding to the first pressure chamber row L1 and the holding portion 31 of the sealing substrate 30 corresponding to the second pressure chamber row L2. Thereby, information on the humidity of each pressure chamber row can be acquired with high accuracy. Here, the positions of the humidity detection sections 210 are not limited to the four positions. The humidity detection sections 210 may be disposed at any one position of positions adjacent to the first pressure chamber row L1 on the +Y direction side and the −Y direction side and positions adjacent to the second pressure chamber row L2 on the +Y direction side and the −Y direction side in the second arrangement direction, and may be disposed in any positions obtained by combining a plurality of these positions. Here, preferably, the humidity detection sections 210 are formed in a number corresponding to the number of the holding portions 31.

The region in which the humidity detection section 210 is disposed can be formed to be smaller than the region of the temperature detection section 410 or the like. For example, as illustrated in FIG. 4, as compared with the temperature detection region that is particularly long in the arrangement direction and is likely to have a large area in order to measure the entire flow path of the ink, the region in which the interlayer 215 of the humidity detection section 210 is disposed can be reduced. Therefore, for example, by disposing the humidity detection section 210 to be adjacent to the temperature detection region, the humidity detection section 210 and the temperature detection section 410 can be efficiently disposed.

As illustrated in FIG. 6, the humidity detection section 210 includes humidity detection wirings 94, a first detection electrode 211, a second detection electrode 212, and an interlayer 215. The interlayer 215 is a humidity detection target, and is formed of a material of which the resistance changes with humidity. For the interlayer 215, among the members included in the liquid ejecting head 510, as a member of which the performance may deteriorate because of the influence of the humidity in the piezoelectric element 300 or in the vicinity of the piezoelectric element 300, a member to be laminated on at least one of the piezoelectric body 70, the vibration plate 50, or the pressure chamber substrate 10 may be adopted. In the present embodiment, the same material as the material of the protective film 82 is used as the interlayer 215. For example, the protective film 82 may deteriorate because of relatively high temperature and humidity to cause a problem. On the other hand, by using the protective film 82 as the interlayer 215, a deterioration of the protective film 82 can be detected in advance. The interlayer 215 may be doped with a metal such as chromium (Cr) by ion filling or the like such that a current for humidity detection is likely to flow.

In the present embodiment, the interlayer 215 is laminated on the piezoelectric body 70 by using the same material as the material of the protective film 82 in a process prior to the process of forming the protective film 82. Here, the interlayer 215 may be provided on the surface of the piezoelectric body 70 together with the protective film 82 in the process of forming the protective film 82. In this case, by sharing the process of forming the interlayer 215 with the process of forming the protective film 82, productivity of the liquid ejecting head 510 can be improved.

The humidity detection wirings 94 include a first humidity detection wiring 941 that electrically couples the wiring substrate 120 and the first detection electrode 211 and a second humidity detection wiring 942 that electrically couples the wiring substrate 120 and the second detection electrode 212. End portions of the first humidity detection wiring 941 and the second humidity detection wiring 942 extend so as to be exposed to the through hole 32 of the sealing substrate 30, and are electrically coupled to the wiring substrate 120 in the through hole 32.

A material of the humidity detection wiring 94 is a conductive material. For example, gold (Au), copper (Cu), titanium (Ti), tungsten (W), nickel (Ni), chromium (Cr), platinum (Pt), aluminum (Al), and the like can be used. The material of the humidity detection wiring 94 is gold (Au) that is the same as the materials of the first drive wiring 91, the second drive wiring 92, and the temperature detection wiring 93. Here, any material other than gold (Au) may be used for the humidity detection wiring 94, and the material may be different from the materials of the first drive wiring 91, the second drive wiring 92, and the temperature detection wiring 93.

As illustrated in FIG. 4, the first drive wiring 91, the second drive wiring 92, the temperature detection wiring 93, and the humidity detection wiring 94 are coupled to the wiring substrate 120 in this order from the center CP of the liquid ejecting head 510 toward the outer side of the liquid ejecting head 510. The "outer side of the liquid ejecting head 510" means a position closer to a circumference edge portion of the pressure chamber substrate 10 than a predetermined reference position in a direction away from the center CP. The liquid ejecting head 510 of the present embodiment is configured to have the following features (1) to (3) by disposing the conductor wirings to be coupled to the wiring substrate 120 in this order.

(1) The first humidity detection wiring 941 and the second humidity detection wiring 942 are further disposed on the outer side of the liquid ejecting head 510 with respect to the first drive wiring 91 and the second drive wiring 92.

(2) The first drive wiring 91 and the second drive wiring 92 are disposed at positions other than the region 94P between the first humidity detection wiring 941 and the second humidity detection wiring 942.

As described above, the drive voltage may be applied to the first drive wiring 91 at a high frequency of ink ejecting timings. By disposing the first humidity detection wiring 941 and the second humidity detection wiring 942 at positions separated from the first drive wiring 91 and the second drive wiring 92, an influence of noise of the drive voltage on the humidity detection can be suppressed or prevented.

(3) The first temperature detection wiring 931 and the second temperature detection wiring 932 are further disposed on the outer side of the liquid ejecting head 510 with respect to the first drive wiring 91 and the second drive wiring 92, and the first humidity detection wiring 941 and the second humidity detection wiring 942 are further disposed on the outer side of the liquid ejecting head 510 with respect to the first temperature detection wiring 931 and the second temperature detection wiring 932.

By disposing the temperature detection wiring 93 between the first drive wiring 91 and the second drive wiring 92 and the humidity detection wiring 94, the first humidity detection wiring 941 and the second humidity detection wiring 942 can be disposed at positions away from the first drive wiring 91 and the second drive wiring 92. Therefore, an influence of noise of the drive voltage on the humidity detection can be suppressed or prevented. Further, by disposing the first temperature detection wiring 931 and the second temperature detection wiring 932 at positions closer to the drive wiring than the first humidity detection wiring 941 and the second humidity detection wiring 942, a distance from the humidity detection wiring 94 to the ink flow path can be shortened. Therefore, the wiring lengths of the temperature detection resistor 415 and the temperature detection wiring 93 can be shortened, and thus the temperature and the humidity can be efficiently detected.

The first detection electrode 211 and the second detection electrode 212 are formed in the same layer so as to be electrically discontinuous to each other. The first detection electrode 211 and the second detection electrode 212 are provided on the interlayer 215 to be in contact with the interlayer 215 in order to allow the current from the humidity-detection power supply section 230, which is a constant current circuit, to flow on the surface of the interlayer 215. "current flows through the interlayer 215" includes that a current flows through the inside of the interlayer 215, the surface of the interlayer 215, and a boundary surface between the interlayer 215 and another layer.

Figure 8:
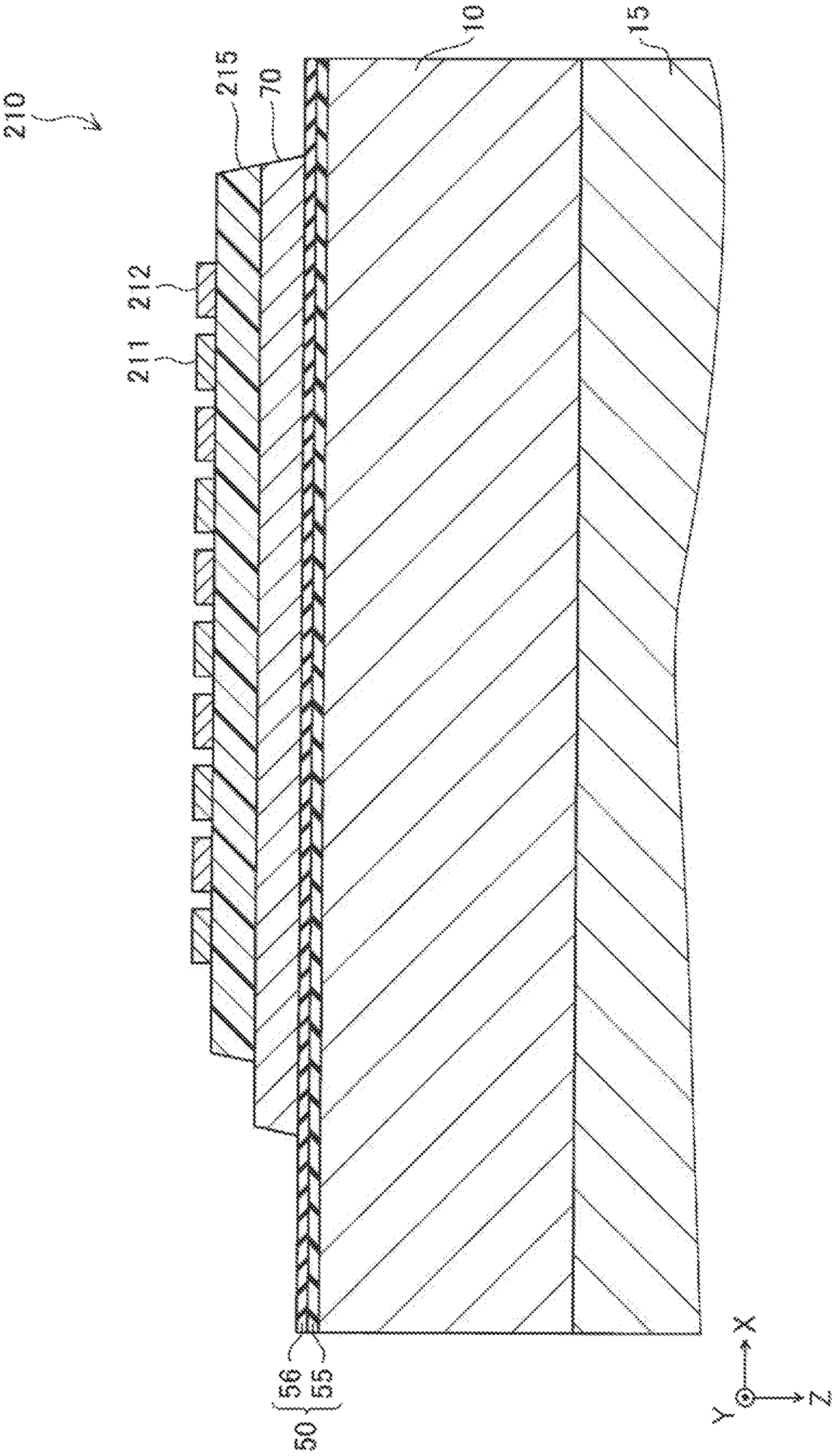
FIG. 8 is a cross-sectional view illustrating a VIII-VIII position of FIG. 6.

FIG. 8 is a cross-sectional view illustrating a VIII-VIII position of FIG. 6. In the present embodiment, as illustrated in FIG. 8, the first detection electrode 211 and the second detection electrode 212 are disposed on the other side of the lamination direction with respect to the interlayer 215, that is, on the upper surface of the interlayer 215. The surface of the interlayer 215 is exposed between the first detection electrode 211 and the second detection electrode 212, and the current from the first detection electrode 211 and the second detection electrode 212 may flow on the surface of the interlayer 215. Thereby, the resistance of the surface of the protective film 82 can be detected. Therefore, a temporal change in the moisture absorption state of the protective film 82 can be managed, and a temporal change in the performance of the protective film 82 because of humidity can be managed.

The first detection electrode 211 and the second detection electrode 212 can be formed in any shape. In the present embodiment, the first detection electrode 211 and the second detection electrode 212 adopt a so-called comb shape suitable for evaluation of insulation deterioration because of ion migration or the like, and are disposed so as to face each other on the surface of the interlayer 215. More specifically, as illustrated in FIG. 6, the first detection electrode 211 includes a first electrode portion 211P1 extending along a certain first direction and a plurality of second electrode portions 211P2 coupled to the first electrode portion 211P1. The plurality of second electrode portions 211P2 extend along a second direction intersecting with the first direction, and are disposed to be separated from each other. In the example of FIG. 6, the first direction coincides with the X-axis direction, and the second direction coincides with the Y-axis direction.

Similarly, the second detection electrode 212 includes a third electrode portion 212P3 extending along a certain third direction and a plurality of fourth electrode portions 212P4 coupled to the third electrode portion 212P3. The fourth electrode portions 212P4 extend along a fourth direction intersecting with the third direction, and are disposed to be separated from each other. In the example of FIG. 6, the third direction coincides with the X-axis direction, and is parallel to the first direction. The fourth direction coincides with the Y-axis direction, and is parallel to the second direction. As illustrated in FIG. 6, the plurality of second electrode portions 211P2 and the plurality of fourth electrode portions 212P4 are alternately disposed. A distance between the plurality of second electrode portions 211P2 and the plurality of fourth electrode portions 212P4 is preferably close enough to be suitable for migration evaluation, and is preferably constant regardless of location.

The first detection electrode 211 and the second detection electrode 212 can be formed of any conductive material, and can be formed of, for example, a conductive material such as a metal, such as platinum (Pt), iridium (Ir), gold (Au), and titanium (Ti), or a conductive metal oxide such as indium tin oxide which is abbreviated as ITO. The first detection electrode 211 and the second detection electrode 212 may be formed by laminating a plurality of materials such as platinum (Pt), iridium (Ir), gold (Au), and titanium (Ti). The first detection electrode 211 and the second detection electrode 212 may be made of the same material or different materials from each other.

In the present embodiment, the same iridium (Ir) as the material of the second drive electrode 80 is used for the first detection electrode 211 and the second detection electrode 212. By sharing the process of forming the first detection electrode 211 and the second detection electrode 212 with the process of forming the second drive electrode 80, productivity of the liquid ejecting head 510 can be improved. For the first detection electrode 211 and the second detection electrode 212, for example, gold (Au), copper (Cu), titanium (Ti), tungsten (W), nickel (Ni), chromium (Cr), platinum (Pt), aluminum (Al), or the like can also be used. The materials of the first detection electrode 211 and the second detection electrode 212 can be the same as the materials of the first drive wiring 91, the second drive wiring 92, the temperature detection wiring 93, and the humidity detection wiring 94. As an example of the process order when sharing the process of forming the first detection electrode 211 and the second detection electrode 212 with the process of forming the second drive electrode 80, first, the interlayer 215 is formed using the same material as the material of the protective film 82, and the first detection electrode 211, the second detection electrode 212, and the second drive electrode 80 are formed in the same process. Thereafter, the protective film 82 is formed at the drive electrode end portion position.

As described above, the liquid ejecting head 510 of the present embodiment includes the wiring substrate 120, the plurality of pressure chambers 12 that accommodate the ink and communicate with the nozzles 21, the drive element that is electrically coupled to the wiring substrate 120 and changes the pressure inside the pressure chamber 12, and the humidity detection section 210 that is electrically coupled to the wiring substrate 120 and detects the humidity of the drive element or a member on the periphery of the drive element. With the liquid ejecting head 510 configured as described above, information on the humidity of the drive element can be detected by a simple structure in which the drive element and the humidity detection section 210 are coupled to one wiring substrate 120.

With the liquid ejecting head 510 of the present embodiment, the drive element is the piezoelectric element 300 including the first drive electrode 60, the second drive electrode 80, and the piezoelectric body 70. Therefore, information on the humidity of the piezoelectric element 300 among the component members of the liquid ejecting head 510 can be detected, and the influence of the humidity on the piezoelectric element 300 and the member in the vicinity of the piezoelectric element 300 can be appropriately managed.

The liquid ejecting head 510 of the present embodiment further includes the vibration plate 50 which is provided on the lower side of the piezoelectric element 300 and the pressure chamber substrate 10 which is provided on the lower side of the vibration plate 50 and on which the plurality of pressure chambers 12 are provided. The humidity detection section 210 includes the interlayer 215 which is laminated on the piezoelectric body 70 and of which the resistance or the capacitance changes according to humidity, the first detection electrode 211 which is in contact with the interlayer 215, and the second detection electrode 212 which is in contact with the interlayer 215, the second detection electrode 212 facing the first detection electrode 211. By using the resistance between the first detection electrode 211 and the second detection electrode 212, information on the humidity of the interlayer 215 laminated on the piezoelectric body 70 can be detected with high accuracy. Therefore, the influence of the humidity on the piezoelectric element 300 and the member in the vicinity of the piezoelectric element 300 can be appropriately managed.

With the liquid ejecting head 510 of the present embodiment, the first detection electrode 211 and the second detection electrode 212 are formed of the same material as the material of the second drive electrode 80. The process of forming the first detection electrode 211 and the second detection electrode 212 can be shared with the process of forming the second drive electrode 80, and thus productivity of the liquid ejecting head 510 can be improved.

The liquid ejecting head 510 of the present embodiment further includes the drive wirings that electrically couple the wiring substrate 120 and the drive element and the humidity detection wirings 94 that electrically couple the wiring substrate 120 and the humidity detection section 210. The drive wirings include a first drive wiring 91 that electrically couples the wiring substrate 120 and the first drive electrode 60 and a second drive wiring 92 that electrically couples the wiring substrate 120 and the second drive electrode 80. The humidity detection wirings 94 include a first humidity detection wiring 941 that electrically couples the wiring substrate 120 and the first detection electrode 211 and a second humidity detection wiring 942 that electrically couples the wiring substrate 120 and the second detection electrode 212. With a simple configuration of the drive wirings and the humidity detection wirings 94 for humidity detection, the piezoelectric element 300 and the humidity detection section 210 can be electrically coupled to one wiring substrate 120.

With the liquid ejecting head 510 of the present embodiment, the first drive wiring 91, the second drive wiring 92, the first humidity detection wiring 941, and the second humidity detection wiring 942 are formed of the same material. The process of forming the humidity detection wiring 94 and the process of forming the first drive wiring 91 and the second drive wiring 92 can be shared, and thus productivity of the liquid ejecting head 510 can be improved.

With the liquid ejecting head 510 of the present embodiment, the first drive wiring 91 and the second drive wiring 92 are disposed at positions other than the region 94P between the first humidity detection wiring 941 and the second humidity detection wiring 942. By disposing the first humidity detection wiring 941 and the second humidity detection wiring 942 at positions separated from the first drive wiring 91 and the second drive wiring 92, an influence of noise of the drive voltage on the humidity detection can be suppressed or prevented.

With the liquid ejecting head 510 of the present embodiment, the first humidity detection wiring 941 and the second humidity detection wiring 942 are further disposed on the outer side of the liquid ejecting head 510 with respect to the first drive wiring 91 and the second drive wiring 92. By disposing the first humidity detection wiring 941 and the second humidity detection wiring 942 at positions separated from the first drive wiring 91 and the second drive wiring 92, an influence of noise of the drive voltage on the humidity detection can be suppressed or prevented.

The liquid ejecting head 510 of the present embodiment further includes the temperature detection section 410 that is electrically coupled to the wiring substrate 120 and detects the temperature inside the pressure chamber 12. Therefore, information on the humidity and the temperature of the drive element can be detected by a simple structure in which the temperature detection section 410 is coupled to one wiring substrate 120 together with the drive element and the humidity detection section 210.

With the liquid ejecting head 510 of the present embodiment, the temperature detection section 410 includes the temperature detection resistor 415 of which the resistance changes according to the temperature, the first temperature detection wiring 931 that is coupled to one end of the temperature detection resistor 415, and the second temperature detection wiring 932 that is coupled to the other end of the temperature detection resistor 415. By using the temperature detection resistor, a temperature detection mechanism can be provided in a narrow region in the vicinity of the pressure chamber 12 on the vibration plate 50.

With the liquid ejecting head 510 of the present embodiment, the first temperature detection wiring 931 and the second temperature detection wiring 932 are further disposed on the outer side of the liquid ejecting head 510 with respect to the first drive wiring 91 and the second drive wiring 92, and the first humidity detection wiring 941 and the second humidity detection wiring 942 are further disposed on the outer side of the liquid ejecting head 510 with respect to the first temperature detection wiring 931 and the second temperature detection wiring 932. The first humidity detection wiring 941 and the second humidity detection wiring 942 can be disposed at positions separated from the first drive wiring 91 and the second drive wiring 92, and thus an influence of noise of the drive voltage on the humidity detection can be suppressed or prevented. Further, by disposing the first temperature detection wiring 931 and the second temperature detection wiring 932 at positions closer to the piezoelectric element 300 than the first humidity detection wiring 941 and the second humidity detection wiring 942, a distance from the humidity detection wiring 94 to the ink flow path can be shortened. Therefore, the wiring lengths of the temperature detection resistor 415 and the temperature detection wiring 93 can be shortened, and thus the temperature and the humidity can be efficiently detected.

With the liquid ejecting head 510 of the present embodiment, the area of the temperature detection region surrounded by the temperature detection resistor 415 is larger than the area of the region in which the interlayer 215 is disposed. By making the area of the region in which the interlayer 215 is disposed smaller than the area of the temperature detection region which is likely to have a large area in order to measure the entire flow path of the ink, the humidity detection section 210 and the temperature detection section 410 can be efficiently disposed.

The liquid ejecting apparatus 500 of the present embodiment includes, in addition to the liquid ejecting head 510, the humidity-detection resistance measurement section 240 that measures the resistance between the first detection electrode 211 and the second detection electrode 212 and the humidity management section 250 that acquires information on the humidity of the interlayer 215 by using the resistance measured by the humidity-detection resistance measurement section 240. Therefore, the liquid ejecting apparatus 500 that can appropriately manage the information on the humidity in the member in the liquid ejecting head 510 can be provided.

With the liquid ejecting apparatus 500 of the present embodiment, the humidity management section 250 is provided on the wiring substrate 120. Thereby, an increase in the size of the liquid ejecting apparatus 500 can be suppressed.

A2. Another Embodiment 1

Figure 9:
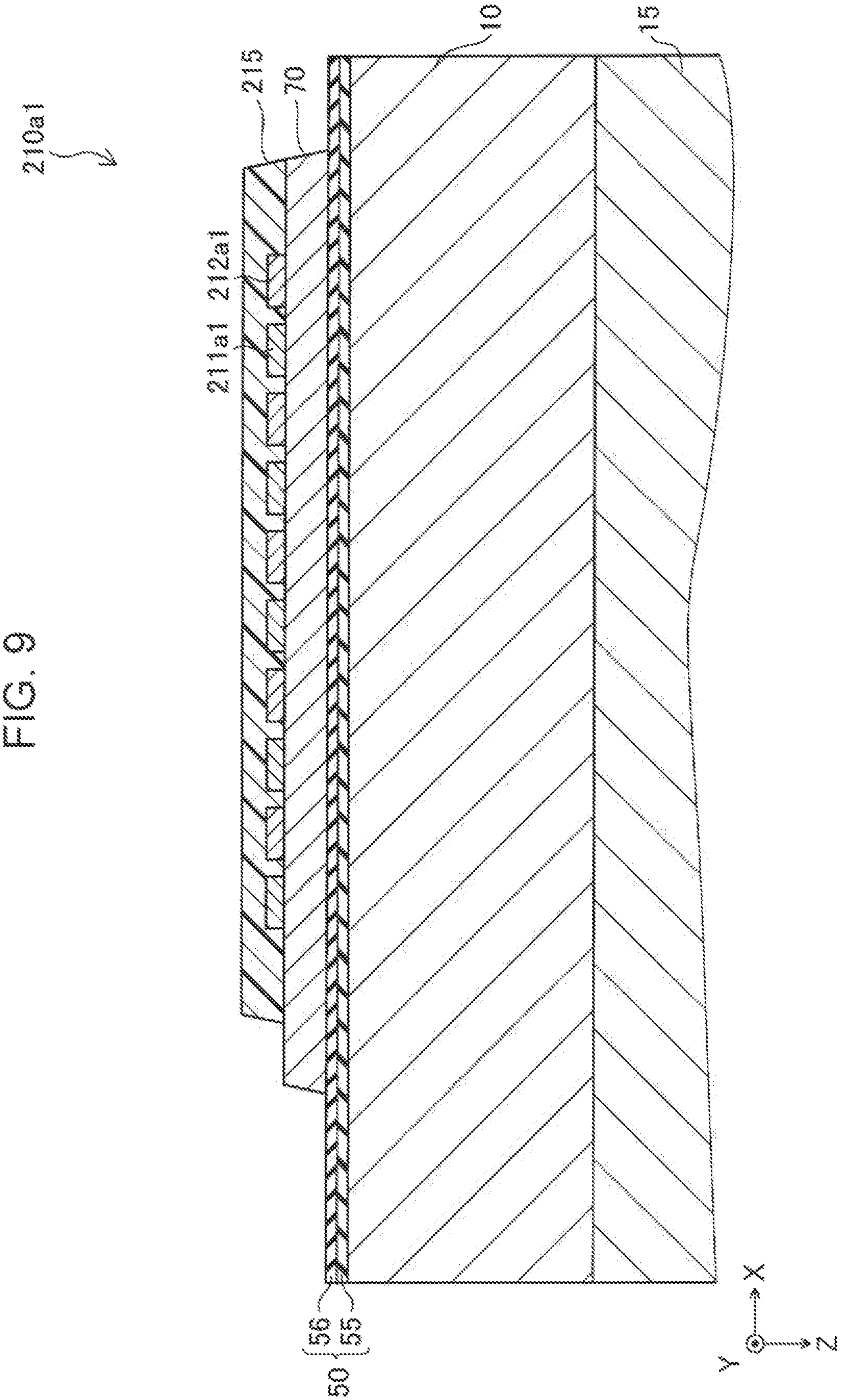
FIG. 9 is an explanatory diagram illustrating a humidity detection section included in a liquid ejecting head according to another embodiment.

FIG. 9 is an explanatory diagram illustrating the humidity detection section **210*a*1 included in the liquid ejecting head of another embodiment. The first embodiment describes an example in which the first detection electrode 211 and the second detection electrode 212 are disposed on the upper side of the interlayer 215. On the other hand, as in the humidity detection section 210*a*1 illustrated in FIG. 9, the first detection electrode 211*a*1 and the second detection electrode 212*a*1 may be disposed in the same layer on the lower side of the interlayer 215. Even in such a configuration, as in the first embodiment, the information on the humidity of the interlayer 215 can be detected with high accuracy, and the influence of the humidity on the piezoelectric element 300 and the member in the vicinity of the piezoelectric element 300 can be appropriately managed. In addition, with such a configuration, the process of forming the first detection electrode 211*a*1 and the second detection electrode 212*a*1 and the process of forming the second drive electrode 80 can be shared. As an example of the process order in this case, first, the first detection electrode 211*a*1, the second detection electrode 212*a*1, and the second drive electrode 80 can be formed in the same process, and then the protective film 82 at the drive electrode end portion position and the interlayer 215** can be simultaneously formed using the same material. Therefore, productivity of the liquid ejecting head can be improved.

In the example of FIG. 9, the first detection electrode **211*a*1 and the second detection electrode 212*a*1 are provided on the upper side of the piezoelectric body 70, and are disposed between the piezoelectric body 70 and the interlayer 215. In this case, an influence of humidity on the layer on the upper side of the boundary surface on which the first detection electrode 211*a*1 and the second detection electrode 212*a*1 are disposed, that is, an influence of humidity on the interlayer 215 in the example of FIG. 9 can be acquired. It is considered that this is because the current flowing between the first detection electrode 211*a*1 and the second detection electrode 212*a*1** is more likely to flow to the lower surface of the upper layer which is more likely to be a porous layer than the lower layer. It is considered that the reason why the lower surface of the upper layer is more likely to be a porous layer is that the upper layer is easily affected by a crystal structure of the lower layer when the upper layer is laminated.

B1. Second Embodiment

Figure 10:
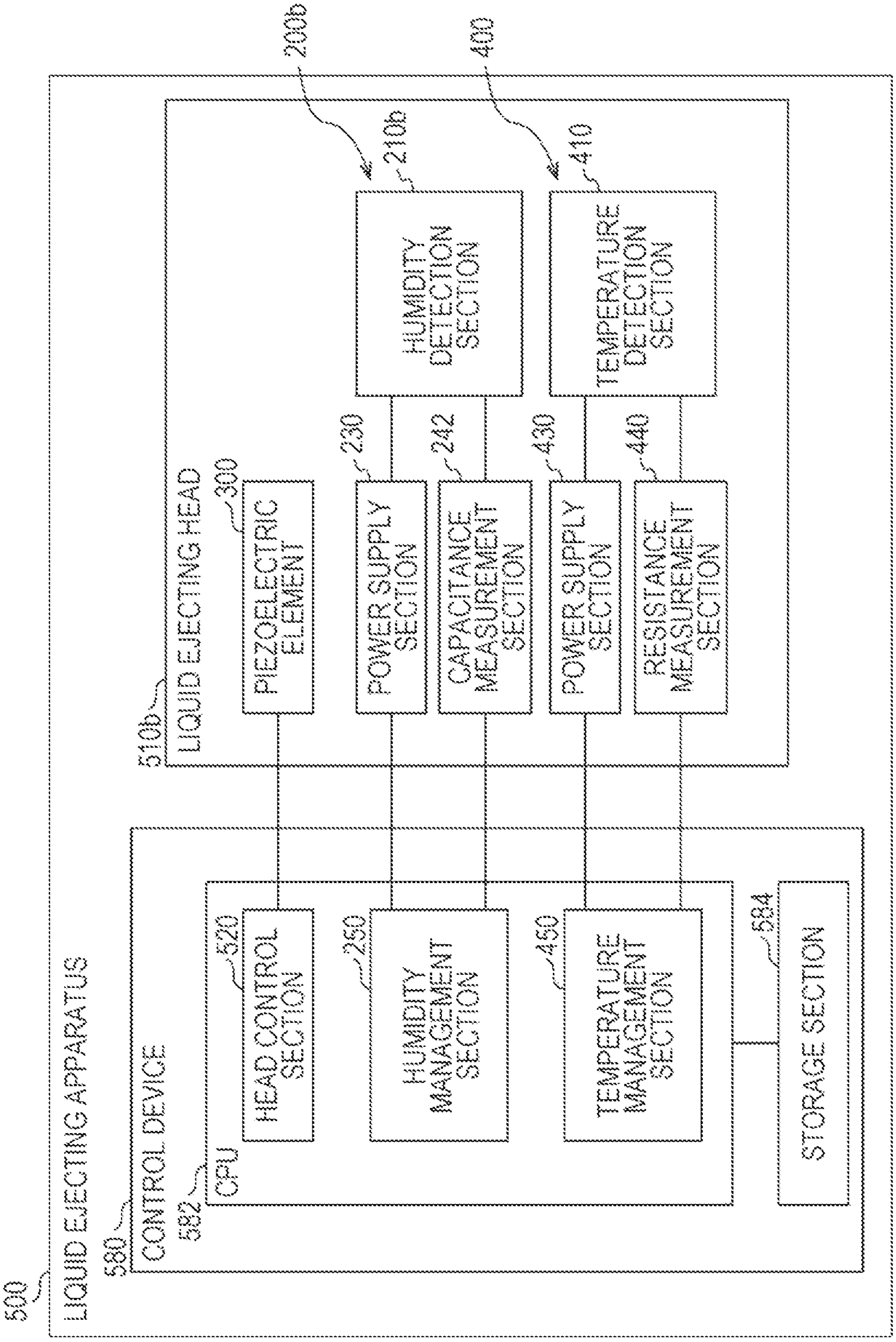
FIG. 10 is a block diagram illustrating a functional configuration of a liquid ejecting head according to a second embodiment.

FIG. 10 is a block diagram illustrating a functional configuration of the liquid ejecting head **510*b* according to a second embodiment of the present disclosure. The liquid ejecting head 510***b* of the second embodiment is different from the liquid ejecting head 510 of the first embodiment in that a humidity detection mechanism 200*b* is provided instead of the humidity detection mechanism 200, and the other configurations are the same.

As illustrated in FIG. 10, the humidity detection mechanism 200*b* includes a humidity detection section 210*b* instead of the humidity detection section 210, and includes a capacitance measurement section 242 instead of the humidity-detection resistance measurement section 240. In the present embodiment, the humidity detection section 210*b* is configured with a capacitance type humidity sensor, and utilizes a property that the dielectric constant changes and the capacitance changes because of moisture absorption of the measurement target. The humidity-detection power supply section 230 applies a predetermined voltage to the humidity detection section 210*b* under a control of the humidity management section 250. The capacitance measurement section 242 detects capacitance of the humidity detection section 210*b* by using, for example, a method of measuring a time until a voltage value of the voltage applied to the humidity detection section 210*b* by the humidity-detection power supply section 230 reaches a predetermined reference voltage. A detection result by the capacitance measurement section 242 is output to the humidity management section 250.

The humidity management section 250 derives information on the humidity of the detection target by using the capacitance of the humidity detection section 210*b* that is acquired from the capacitance measurement section 242 and a humidity calculation equation stored in the storage section 584 in advance. The humidity calculation equation indicates a correspondence relationship between the capacitance of the detection target and the humidity. Instead of the humidity calculation equation, a conversion table indicating a correspondence relationship between the capacitance of the detection target and the humidity may be used. In addition, the storage section 584 may store a correspondence relationship between the capacitance of the detection target and a temporal change in performance of the detection target. The capacitance may be measured by using various general methods such as a constant current discharge method. The capacitance measurement section 242 may be provided in the control device 580.

Figure 11:
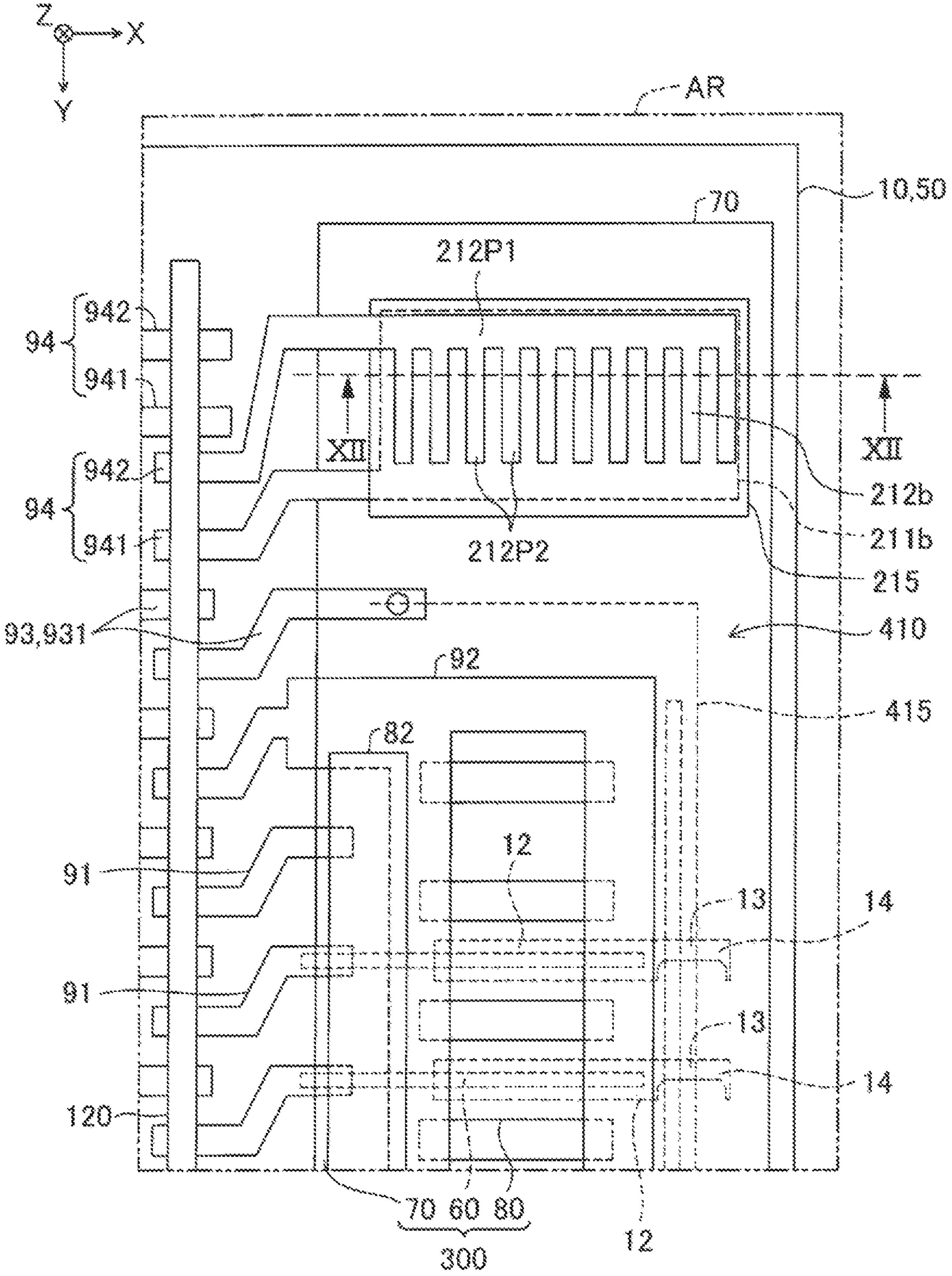
FIG. 11 is an enlarged explanatory diagram illustrating the vicinity of a humidity detection section.

FIG. 11 is an enlarged explanatory diagram illustrating the vicinity of the humidity detection section 210*b*. As illustrated in FIG. 11, the disposition position of the humidity detection section 210*b* in plan view is the same as the disposition position in the first embodiment.

As illustrated in FIG. 11, the humidity detection section 210*b* includes humidity detection wirings 94, a first detection electrode 211*b*, a second detection electrode 212*b*, and an interlayer 215. Since the configuration of the humidity detection wiring 94 is the same as the configuration in the first embodiment, a description thereof will be omitted. The interlayer 215 is a humidity detection target, and functions as a so-called humidity-sensitive film. The interlayer 215 is formed of a material of which the capacitance changes with humidity. In the present embodiment, as in the first embodiment, the same material as the material of the protective film 82 is used for the interlayer 215. For the interlayer 215, for example, a material suitable as a humidity-sensitive film, such as a polymer material such as a cellulose compound, a polyvinyl compound, or an aromatic polymer, or a metal oxide such as aluminum oxide ($Al_2O_3$) or silicon oxide ($SiO_2$), can also be used.

Figure 12:
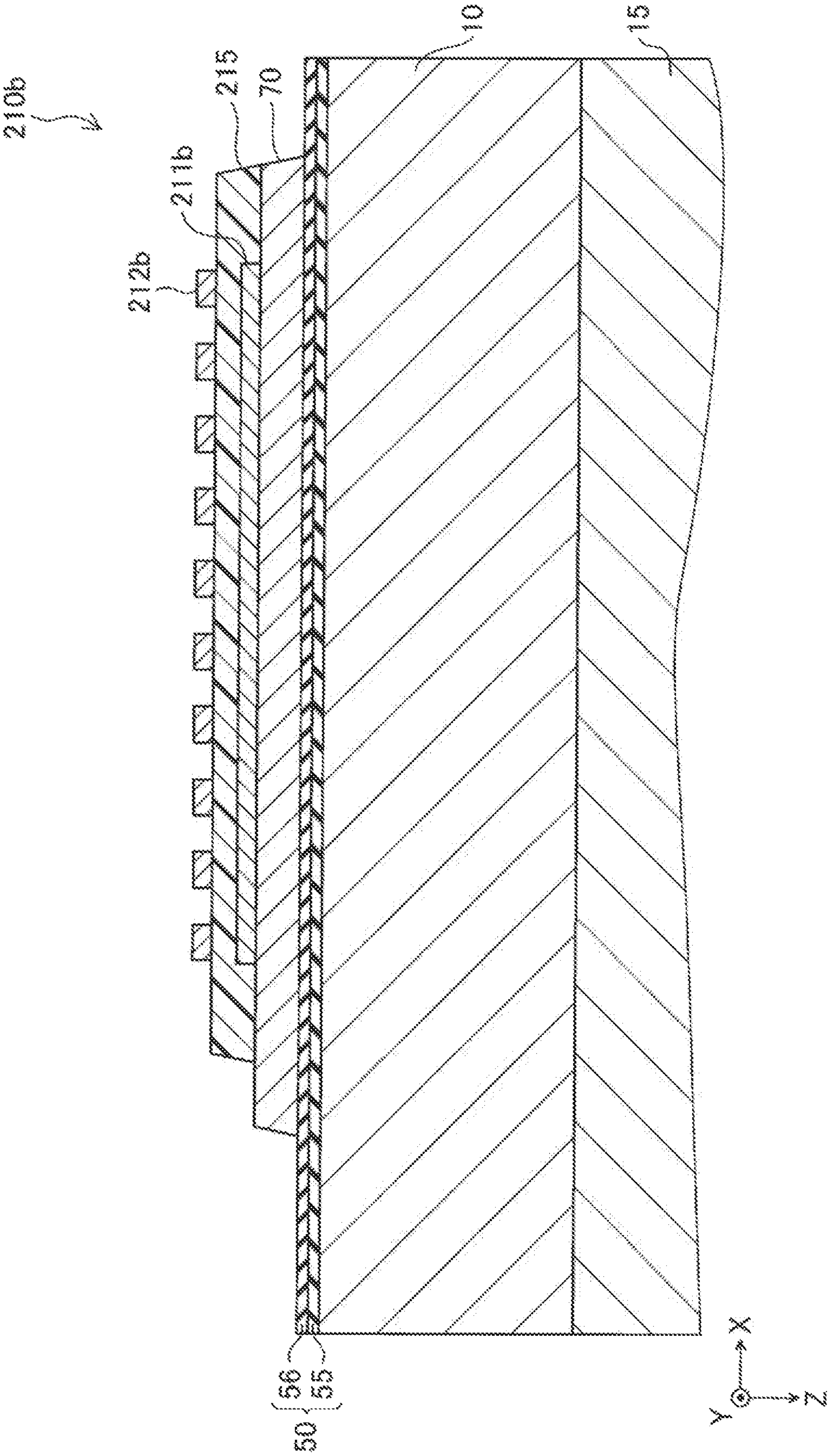
FIG. 12 is a cross-sectional view illustrating an XII-XII position of FIG. 11.

FIG. 12 is a cross-sectional view illustrating an XII-XII position of FIG. 11. As illustrated in FIG. 12, the first detection electrode 211*b* and the second detection electrode 212*b* are formed in different layers, and are electrically discontinuous with each other. The first detection electrode 211*b* and the second detection electrode 212*b* apply a voltage from the humidity-detection power supply section 230 to the interlayer 215. The first detection electrode 211*b* and the second detection electrode 212*b* are both in contact with the interlayer 215, and are disposed so as to face each other with the interlayer 215 interposed therebetween. More specifically, the first detection electrode 211*b* is disposed on one side of the lamination direction, that is, on the lower side of the interlayer 215, and the second detection electrode 212*b* is disposed on the other side of the lamination direction, that is, on the upper side of the interlayer 215. With the configuration, by detecting the change in the capacitance between the first detection electrode 211*b* and the second detection electrode 212*b*, a temporal change in the moisture absorption state of the protective film 82 that serves as the interlayer 215 can be managed, and thus a temporal change in the performance of the protective film 82 because of humidity can be managed.

The first detection electrode 211*b* and the second detection electrode 212*b* can be formed in any shape. In the present embodiment, the first detection electrode 211*b* is formed in a flat plate shape. The second detection electrode 212*b* has the same comb shape as the shape of the first detection electrode 211 or the second detection electrode 212 illustrated in the first embodiment. More specifically, as illustrated in FIG. 11, the second detection electrode 212*b* includes a first electrode portion 212P1 extending along a certain first direction and a plurality of second electrode portions 212P2 coupled to the first electrode portion 212P1. The plurality of second electrode portions 212P2 extend along a second direction intersecting with the first direction, and are arranged to be separated from each other. In the example of FIG. 11, the first direction coincides with the X-axis direction, and the second direction coincides with the Y-axis direction.

Since the second detection electrode 212*b* is formed to cover the upper surface of the interlayer 215, the exposed area of the interlayer 215 can be reduced. As a result, there is a possibility that moisture absorption and dehumidification of the interlayer 215 are inhibited and the detection accuracy is lowered. From a viewpoint of suppressing inhibition of moisture absorption and dehumidification of the interlayer 215, preferably, the second detection electrode 212*b* is formed in a shape such as a flat plate shape or a comb shape in which a through hole is formed, that is, in a shape that allows the upper surface of the interlayer 215 to be exposed, or is formed to have an area smaller than the area of the interlayer 215.

In the present embodiment, the process of forming the first detection electrode 211*b* is shared with the process of forming the second drive electrode 80, and the first detection electrode 211*b* is provided on the piezoelectric body 70. Therefore, the material of the first detection electrode 211*b* is the same iridium (Ir) as the material of the second drive electrode 80. By sharing the process of forming the first detection electrode 211*b* with the process of forming the second drive electrode 80, productivity of the liquid ejecting head 510 can be improved.

In the present embodiment, the process of forming the second detection electrode 212*b* is shared with the process of forming the first drive wiring 91, the second drive wiring 92, the temperature detection wiring 93, or the humidity detection wiring 94, and the second detection electrode 212*b* is provided on the interlayer 215. Therefore, the material of the second detection electrode 212*b* is the same gold (Au) as the material of the first drive wiring 91 or the like. By sharing the process of forming the second detection electrode 212*b* with the process of forming the first drive wiring 91 and the like, productivity of the liquid ejecting head 510 can be improved. As an example of a specific process order, after the piezoelectric body 70 is coated, the first detection electrode 211*b* is formed in the same process as the process of forming the second drive electrode 80, and then the interlayer 215 is formed using the same material as the material of the protective film 82. Thereafter, the second detection electrode 212*b*, the first drive wiring 91, the second drive wiring 92, the temperature detection wiring 93, and the humidity detection wiring 94 are formed in the same process, and then the protective film 82 is formed at the drive electrode end portion position.

As described above, the liquid ejecting head 510*b* of the present embodiment includes the interlayer 215 which is laminated on the piezoelectric body 70 and of which the capacitance changes according to humidity and the first detection electrode 211*b* and the second detection electrode 212*b* that face each other with the interlayer 215 interposed therebetween. With the liquid ejecting head 510*b* configured as described above, by using the capacitance between the first detection electrode 211*b* and the second detection electrode 212*b*, the information on the humidity of the interlayer 215, which is laminated on the piezoelectric body 70 among the component members of the liquid ejecting head 510, can be detected with high accuracy. Therefore, the influence of the humidity on the piezoelectric element 300 or the member in the vicinity of the piezoelectric element 300 can be appropriately managed.

The liquid ejecting apparatus 500 of the present embodiment includes, in addition to the liquid ejecting head 510*b*, a capacitance measurement section 242 that measures capacitance between the first detection electrode 211*b* and the second detection electrode 212*b*, and a humidity management section 250 that acquires information on humidity of the interlayer 215 by using the capacitance measured by the capacitance measurement section 242. Therefore, the liquid ejecting apparatus 500 that can appropriately manage the information on the humidity in the member in the liquid ejecting head 510 can be provided.

With the liquid ejecting head 510*b* of the present embodiment, the first detection electrode 211*b* and the second detection electrode 212*b* are formed of the same material as the material of the second drive electrode 80. The process of forming the first detection electrode 211*b* and the second detection electrode 212*b* can be shared with the process of forming the second drive electrode 80, and thus productivity of the liquid ejecting head 510*b* can be improved.

The liquid ejecting head 510*b* of the present embodiment further includes the protective film 82 that is disposed on the upper side of the pressure chamber substrate 10, more specifically, at the end portion 80*b* of the second drive electrode 80 and on the surface of the piezoelectric body 70, and is formed using a resin material. The interlayer 215 is formed of the same material as the material of the protective film 82. By forming the interlayer 215 using a resin material of which the capacitance is likely to change according to humidity, accuracy of detection of the information on humidity can be improved. Further, by sharing the process of forming the interlayer 215 with the process of forming the protective film 82, productivity of the liquid ejecting head 510*b* can be improved.

With the liquid ejecting head 510*b* of the present embodiment, the first detection electrode 211*b* is disposed on the lower side of the interlayer 215, and the second detection electrode 212*b* is disposed on the upper side of the interlayer 215. As compared with when the first detection electrode 211*b* and the second detection electrode 212*b* are formed in the same layer on the upper side or the lower side of the interlayer 215, the capacitance of the interlayer 215 can be detected with high accuracy.

With the liquid ejecting head 510*b* of the present embodiment, the second detection electrode 212*b* includes the first electrode portion 212P1 extending along the first direction on the surface of the interlayer 215 and the plurality of second electrode portions 212P2 coupled to the first electrode portion 212P1 on the surface of the interlayer 215. The second electrode portions 212P2 extend in the second direction intersecting with the first direction and are arranged to be separated from each other. By forming the second detection electrode 212*b* in a comb shape with an area smaller than an area in a flat plate shape, an exposed area on the upper surface of the interlayer 215 can be increased, and thus inhibition of moisture absorption and dehumidification of the interlayer 215 by the second detection electrode 212*b* can be suppressed or prevented.

With the liquid ejecting head 510*b* of the present embodiment, in plan view, the humidity detection sections 210*b* are disposed at positions adjacent to both sides of the first pressure chamber row L1 along the first arrangement direction and positions adjacent to both sides of the second pressure chamber row L2 along the second arrangement direction. With the liquid ejecting head 510*b* configured as described above, by individually providing the humidity detection sections 210*b* for each of the holding portions 31 of the first pressure chamber row L1 and the second pressure chamber row L2, the information on humidity for each pressure chamber row can be acquired with high accuracy.

B2. Another Embodiment 1

Figure 13:
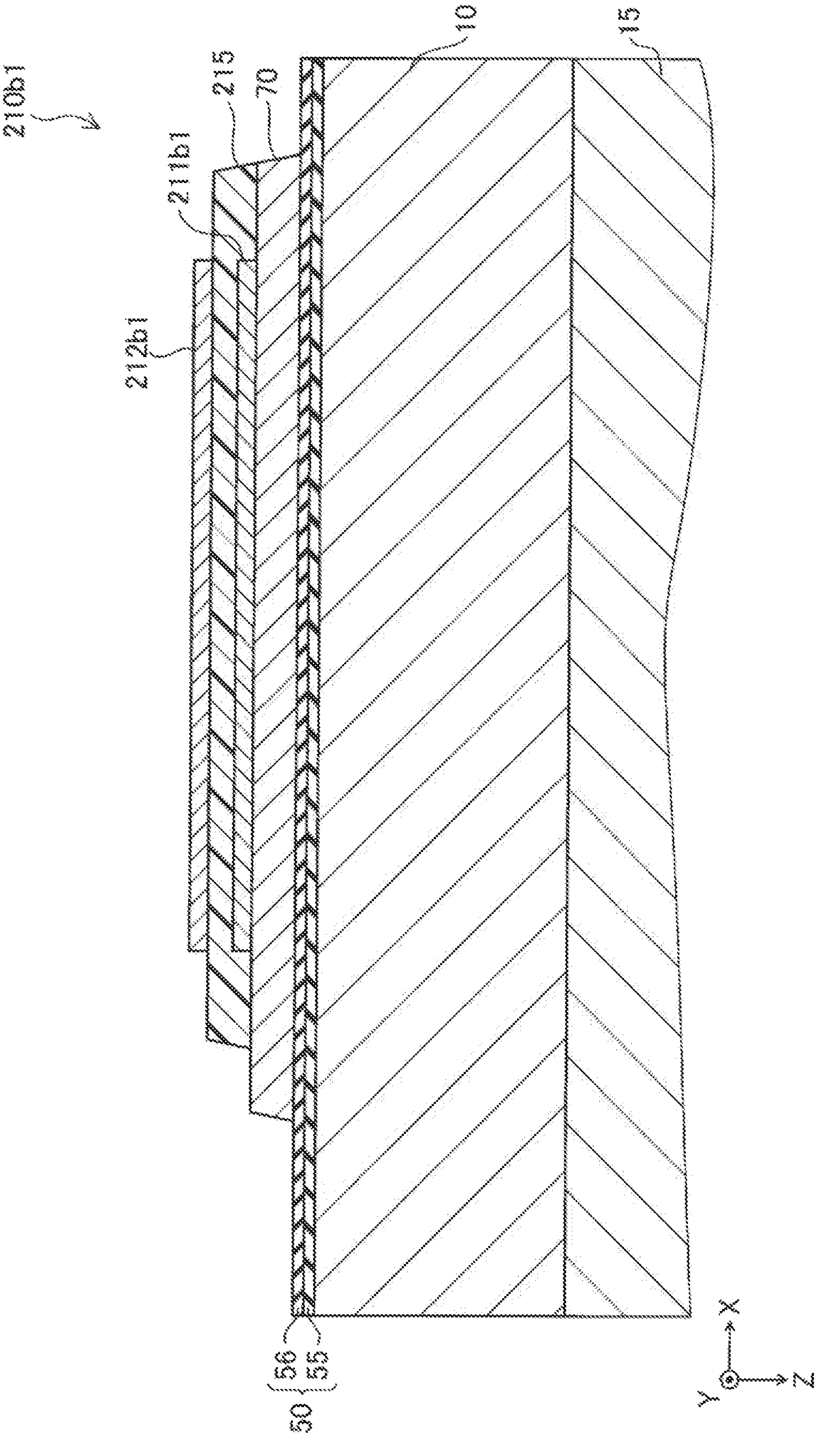
FIG. 13 is an explanatory diagram illustrating a humidity detection section included in a liquid ejecting head according to another embodiment.

FIG. 13 is an explanatory diagram illustrating the humidity detection section 210*b*1 included in the liquid ejecting head of another embodiment. The second embodiment describes an example in which the second detection electrode 212*b* has a comb shape. On the other hand, various shapes can be adopted for the first detection electrode and the second detection electrode. In the example of FIG. 13, both the first detection electrode 211*b*1 and the second detection electrode 212*b*1 are formed in a flat plate shape. In addition to the flat plate shape, the second detection electrode 212*b*1 may have, for example, a shape in which a certain number of through holes having a certain shape are provided in a comb shape. In addition to the comb shape, a so-called zigzag shape in which the conductor reciprocates a plurality of times may be adopted. Further, although not illustrated, the first detection electrode 211*b*1 may have a comb shape similar to the shape of the second detection electrode 212*b*1. For example, the first detection electrode 211*b*1 may have a shape in which a certain number of through holes having a certain shape are provided in a comb shape. In addition to the comb shape, a zigzag shape in which the conductor zigzags may be adopted.

C. Third Embodiment

Figure 14:
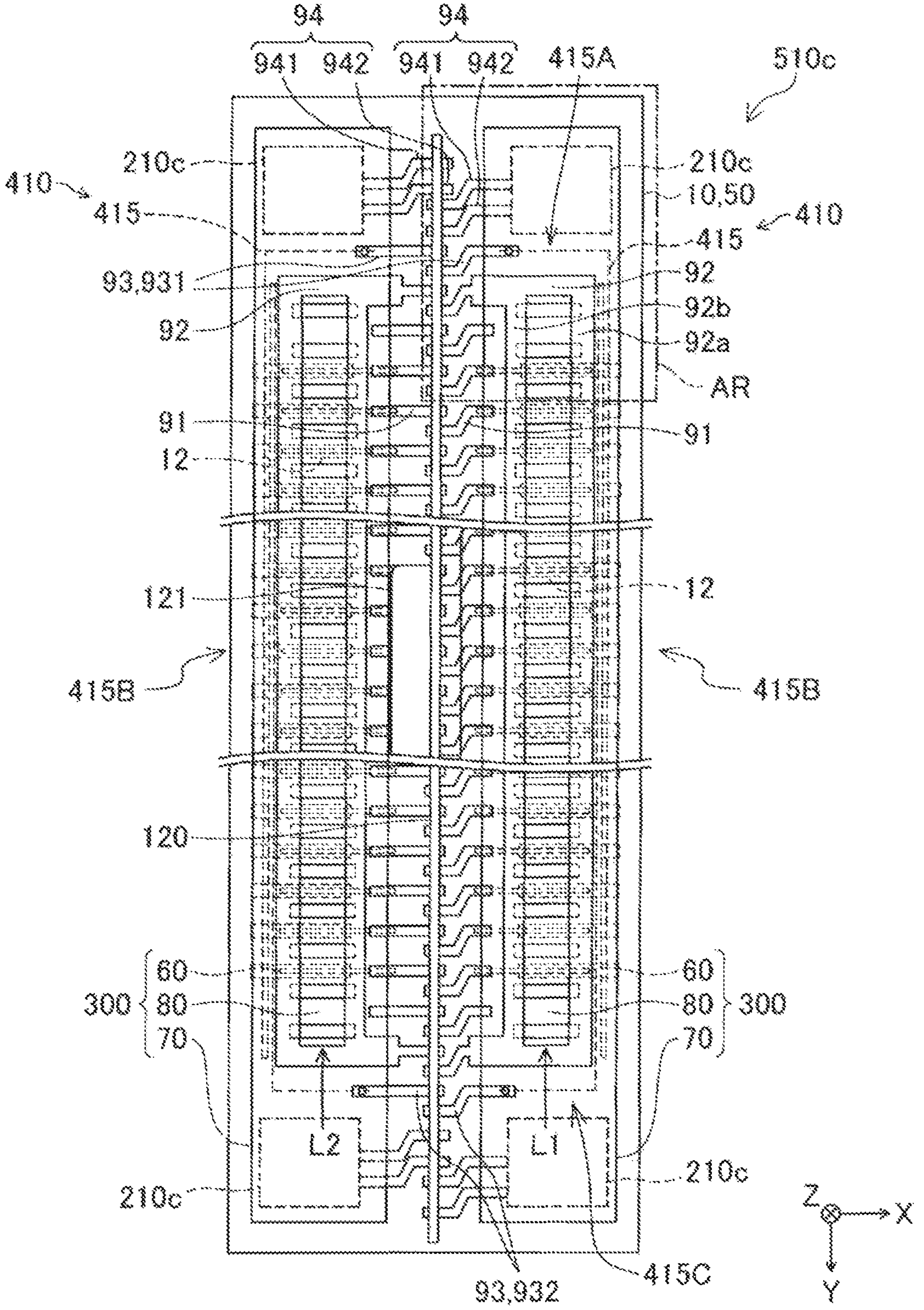
FIG. 14 is an explanatory diagram illustrating a configuration of a liquid ejecting head according to a third embodiment in plan view.

FIG. 14 is an explanatory diagram illustrating a configuration of a liquid ejecting head 510*c* according to a third embodiment of the present disclosure in plan view. The liquid ejecting head 510*c* of the present embodiment is different in that a humidity detection section 210*c* is provided instead of the humidity detection section 210, and the other configurations are the same as the configurations of the liquid ejecting head 510 of the first embodiment.

Figure 15:
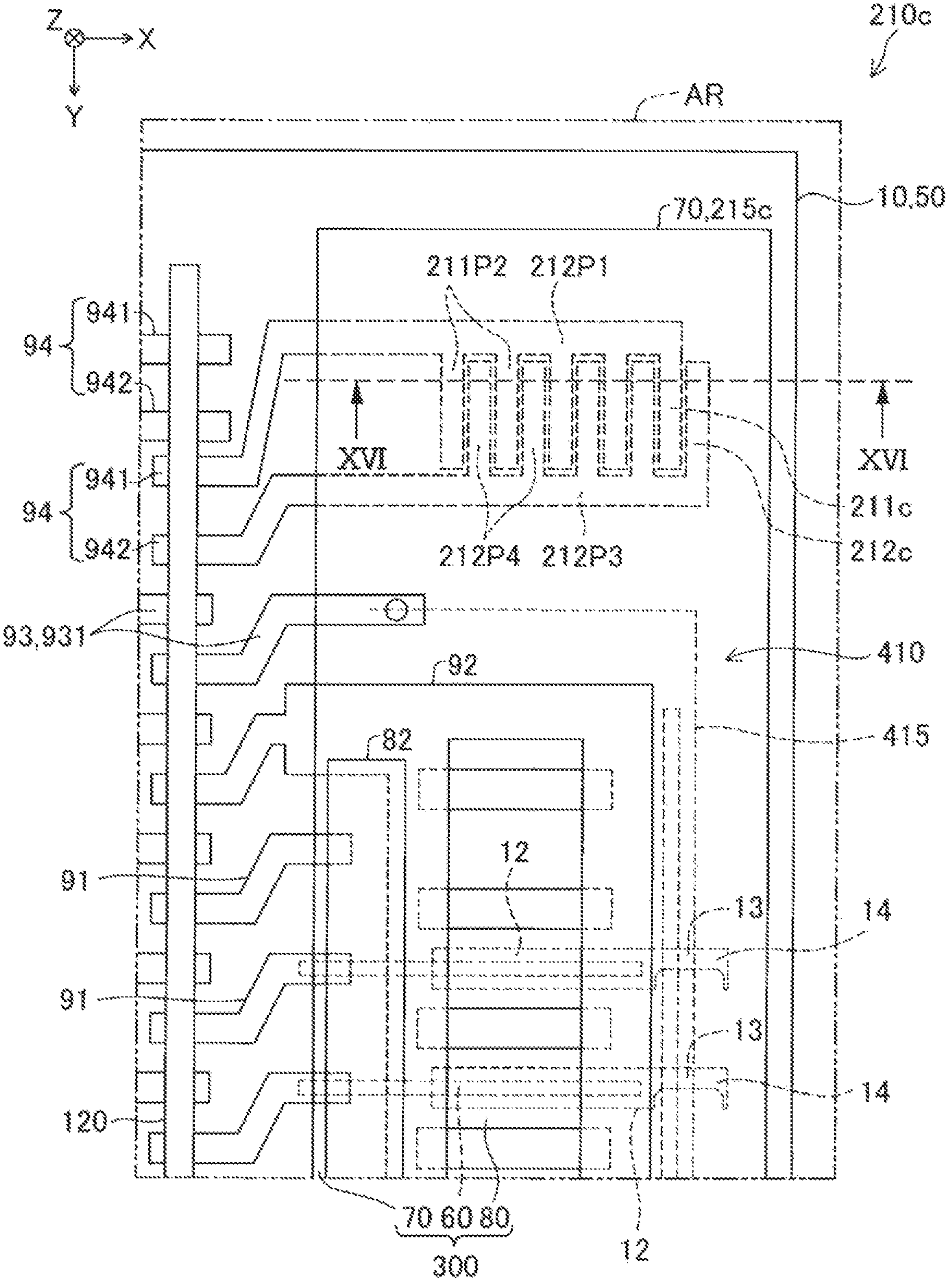
FIG. 15 is an enlarged explanatory diagram illustrating a partial range of FIG. 14.

FIG. 15 is an enlarged explanatory diagram illustrating a partial range AR of FIG. 14. The humidity detection section 210*c* is different from the humidity detection section 210 described in the first embodiment in that the material used for the interlayer is different. More specifically, in the first embodiment, the same material as the material of the protective film 82 is used for the interlayer 215. On the other hand, in the present embodiment, the same material as the material of the piezoelectric body 70 is used for the interlayer 215*c*. As illustrated in FIG. 15, the disposition position of the humidity detection section 210*c* and the shapes of the first detection electrode 211*c* and the second detection electrode 212*c* in plan view are the same as those in the first embodiment.

Figure 16:
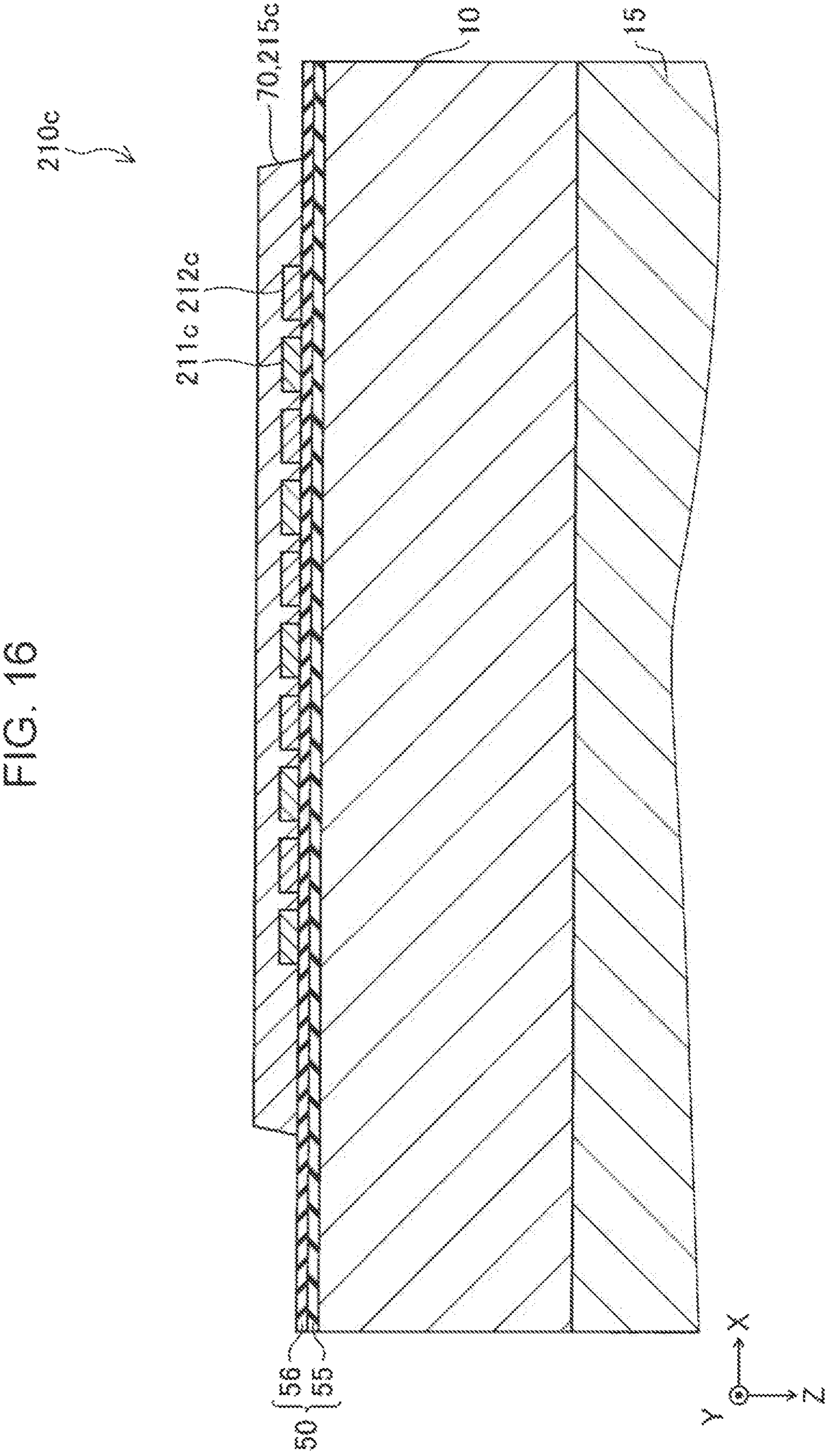
FIG. 16 is a cross-sectional view illustrating an XVI-XVI position of FIG. 15.

FIG. 16 is a cross-sectional view illustrating an XVI-XVI position of FIG. 15. As illustrated in FIG. 16, the present embodiment is different from the first embodiment in that the first detection electrode 211*c* and the second detection electrode 212*c* are disposed on the lower side of the piezoelectric body 70 which serves as the interlayer 215*c*. More specifically, the first detection electrode 211*c* and the second detection electrode 212*c* are provided on the vibration plate 50, and are disposed between the vibration plate 50 and the piezoelectric body 70.

In the present embodiment, the first detection electrode 211*c* and the second detection electrode 212*c* are formed of the same material as the material of the first drive electrode 60. The process of forming the first detection electrode 211*c* and the second detection electrode 212*c* is shared with the process of forming the first drive electrode 60, and when forming the first drive electrode 60 on the vibration plate 50, the first detection electrode 211*c* and the second detection electrode 212*c* are also formed. After the first detection electrode 211*c* and the second detection electrode 212*c* are formed, the piezoelectric body 70 is laminated in a region including the first detection electrode 211*c* and the second detection electrode 212*c*.

The first detection electrode 211*c* and the second detection electrode 212*c* are not limited to being disposed on the lower side of the piezoelectric body 70, and can be disposed on the upper surface of the piezoelectric body 70 in a state of being exposed. In this case, the process of forming the first detection electrode 211*c* and the second detection electrode 212*c* can be shared with the process of forming the second drive electrode 80, and the first detection electrode 211*c* and the second detection electrode 212*c* can be formed together with the second drive electrode 80 after the piezoelectric body 70 is formed.

As described above, the liquid ejecting head 510*c* of the second embodiment includes the piezoelectric body 70 which is laminated on the vibration plate 50, of which the resistance changes according to humidity, and which serves as the interlayer 215*c*. With the liquid ejecting head 510*c* configured as described above, the information on humidity of the piezoelectric body 70 can be detected with high accuracy, and thus an influence of the humidity on the piezoelectric element 300 can be appropriately managed.

With the liquid ejecting head 510*c* of the present embodiment, the first detection electrode 211*c* and the second detection electrode 212*c* are formed of the same material as the material of the first drive electrode 60. With the configuration, the process of forming the first detection electrode 211*c* and the second detection electrode 212*c* can be shared with the process of forming the first drive electrode 60, and thus productivity of the liquid ejecting head 510*c* can be improved.

With the liquid ejecting head 510*c* of the present embodiment, the first detection electrode 211*c* and the second detection electrode 212*c* are disposed in the same layer on the lower side of the interlayer 215*c* which is formed of the same material as the material of the piezoelectric body 70. By forming the first detection electrode 211*c* and the second detection electrode 212*c* in the same layer, the process of forming the first detection electrode 211*c* and the process of forming the second detection electrode 212*c* can be easily shared. Further, by forming the first detection electrode 211*c* and the second detection electrode 212*c* on the lower side of the piezoelectric body 70, the process of forming the first detection electrode 211*c* and the second detection electrode 212*c* can be easily shared with the process of forming the first drive electrode 60.

D. Fourth Embodiment

Figure 17:
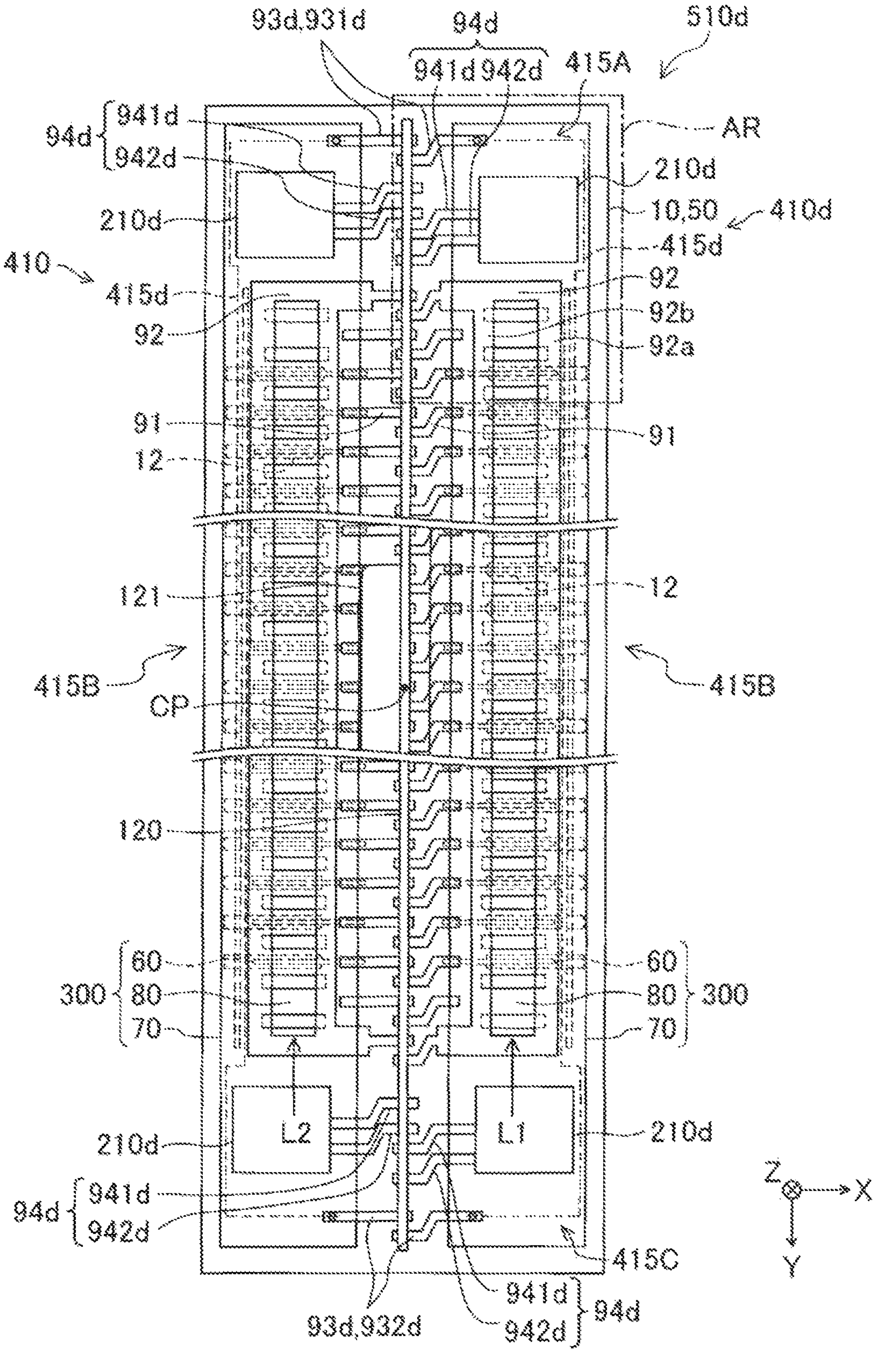
FIG. 17 is an explanatory diagram illustrating a configuration of a liquid ejecting head according to a fourth embodiment in plan view.

FIG. 17 is an explanatory diagram illustrating a configuration of a liquid ejecting head 510*d* according to a fourth embodiment in plan view. The liquid ejecting head 510*d* of the present embodiment is different from the liquid ejecting head 510 of the first embodiment in that the arrangement order of the first drive wiring 91, the second drive wiring 92, the temperature detection wiring 93*d*, and the humidity detection wiring 94*d* with respect to the wiring substrate 120 is different and the relative disposition positions of the humidity detection section 210*d* and the temperature detection section 410*d* are different, and other configurations are the same.

In each of the embodiments, an example in which the first drive wiring 91, the second drive wiring 92, the temperature detection wiring 93, and the humidity detection wiring 94 are coupled to the wiring substrate 120 in this order from the center CP of the liquid ejecting head toward the outside is described. In the plan view illustrated in FIG. 17, the liquid ejecting head 510*d* of the present embodiment is common to the liquid ejecting head of each embodiment in that the first humidity detection wiring 941*d* and the second humidity detection wiring 942*d* of the humidity detection wiring 94*d* are further disposed on the outer side of the liquid ejecting head 510 with respect to the first drive wiring 91. On the other hand, the liquid ejecting head 510*d* of the present embodiment is different from the liquid ejecting head of each embodiment in that the first temperature detection wiring 931*d* and the second temperature detection wiring 932*d* of the temperature detection wiring 93*d* are further disposed on the outer side of the liquid ejecting head 510 with respect to the first humidity detection wiring 941 and the second humidity detection wiring 942.

As illustrated in FIG. 17, in plan view, as in the first embodiment, the humidity detection sections 210*d* are disposed at total four positions including positions adjacent to both sides of the first pressure chamber row L1 along the first arrangement direction and positions adjacent to both sides of the second pressure chamber row L2 along the second arrangement direction. On the other hand, the humidity detection section 210*d* is different from the humidity detection section 210 described in the first embodiment in that the relative position of the humidity detection section 210*d* with respect to the temperature detection section 410*d* is different, and the other configurations are the same.

As illustrated in FIG. 17, in the present embodiment, the first temperature detection wiring 931*d* and the second temperature detection wiring 932*d* are disposed on the outermost side of the wiring substrate 120 among the conductor wirings coupled to the wiring substrate 120. The temperature detection resistor 415*d* is disposed so as to detour the vicinity of the humidity detection section 210*d* so as not to intersect with the humidity detection section 210*d*. As in each of the embodiments, the second extension portion 415B of the temperature detection resistor 415*d* is disposed so as to pass the throttle portion 13 in the vicinity of each pressure chamber 12 from the viewpoint of improving the accuracy of detection of the temperature of the ink in the pressure chamber 12.

With the liquid ejecting head 510*d* of the present embodiment, the first humidity detection wiring 941*d* and the second humidity detection wiring 942*d* are further disposed on the outer side of the liquid ejecting head 510*d* with respect to the first drive wiring 91, and the first temperature detection wiring 931*d* and the second temperature detection wiring 932*d* are further disposed on the outer side of the liquid ejecting head 510*d* with respect to the first humidity detection wiring 941*d* and the second humidity detection wiring 942*d*. The temperature detection section 410*d* and the humidity detection section 210*d* can be disposed in the holding portion 31, and an influence of noise of the drive voltage on temperature detection can be suppressed or prevented by separating the first temperature detection wiring 931*d* and the second temperature detection wiring 932*d* from the first drive wiring 91. Further, by disposing the humidity detection wiring 94*d* between the temperature detection wiring 93*d* and the first drive wiring 91, transmission of noise of the drive voltage to the temperature detection section 410*d* is suppressed by the humidity detection section 210*d*, and thus an influence of noise of the drive voltage on temperature detection can be further reduced. The frequency of temperature detection using the first temperature detection wiring 931*d* and the second temperature detection wiring 932*d* is preferably higher than the frequency of humidity detection using the first humidity detection wiring 941*d* and the second humidity detection wiring 942*d*. With the configuration, an effect of disposing the detection wirings of the present embodiment becomes remarkable.

With the liquid ejecting head 510*d* of the present embodiment, the first temperature detection wiring 931*d*, the first humidity detection wiring 941*d*, the second drive wiring 92, and the first drive wiring 91 are disposed in this order from the outer side of the liquid ejecting head 510*d* toward the center CP of the liquid ejecting head 510*d*.

As in each of the embodiments, the humidity detection section 210*d* can be disposed at the piezoelectric element 300 or in the vicinity of the piezoelectric element 300, and the temperature detection resistor 415*d* can be disposed in the vicinity of the pressure chamber 12 which is an ink flow path. Further, by disposing the temperature detection section 410*d* outside the humidity detection section 210*d*, an influence of noise of the drive voltage on the temperature detection section 410*d* can be suppressed by the humidity detection section 210*d*, and thus an influence of noise of the drive voltage on temperature detection can be further reduced.

E. Fifth Embodiment

Figure 18:
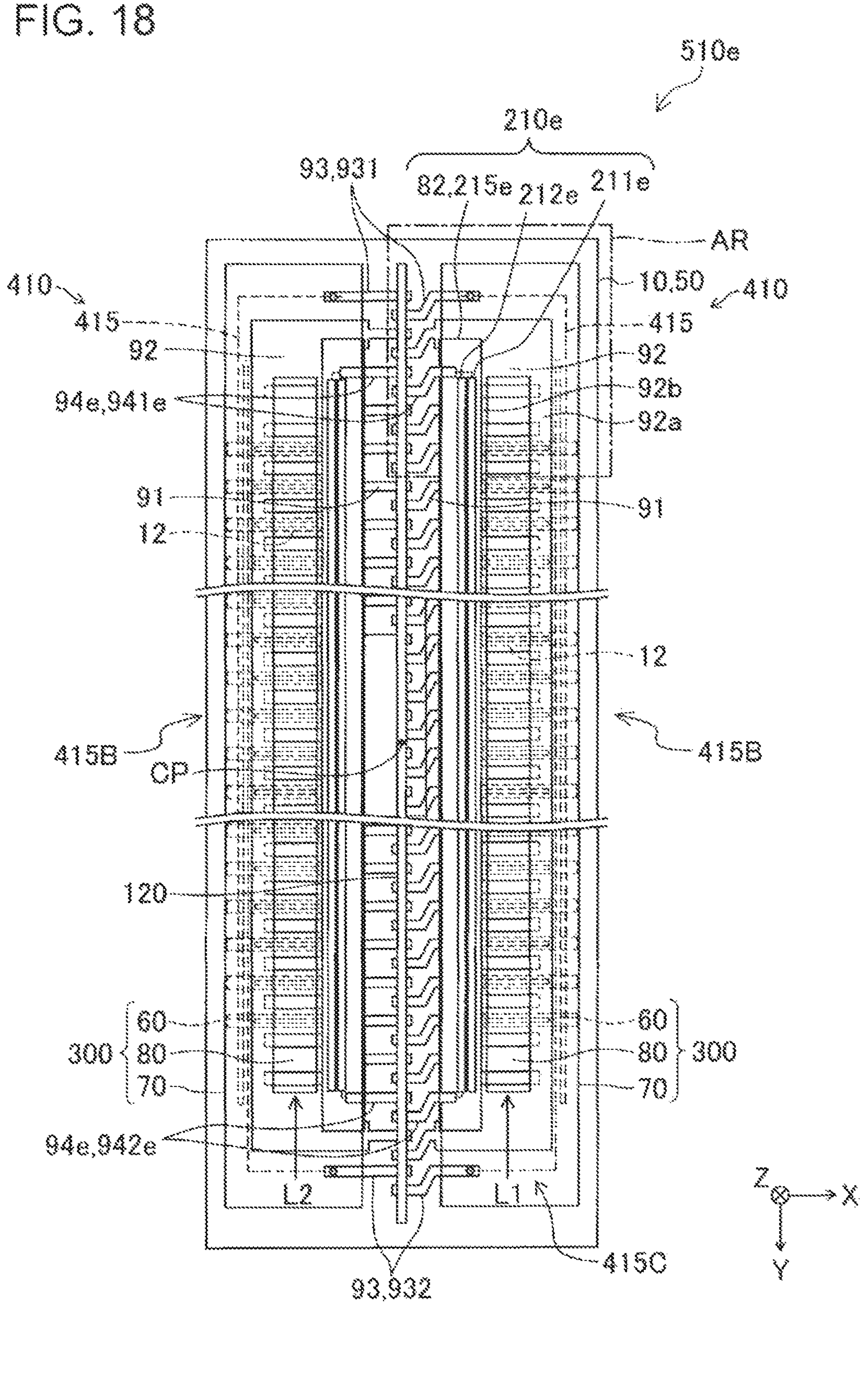
FIG. 18 is an explanatory diagram illustrating a configuration of a liquid ejecting head according to a fifth embodiment in plan view.

FIG. 18 is an explanatory diagram illustrating a configuration of a liquid ejecting head 510*e* according to a fifth embodiment in plan view. The liquid ejecting head 510*e* of the present embodiment is different from the liquid ejecting head 510 of the first embodiment in that the arrangement order of the first drive wiring 91, the second drive wiring 92, the temperature detection wiring 93*e*, and the humidity detection wiring 94*e* with respect to the wiring substrate 120 is different and the disposition position of the humidity detection section 210*e* is different, and other configurations are the same. More specifically, in plan view illustrated in FIG. 18, the present embodiment is different from the first embodiment in that the first humidity detection wiring 941*e* and the second humidity detection wiring 942*e* are disposed between the first drive wiring 91 and the second drive wiring 92.

As illustrated in FIG. 18, the humidity detection section 210*e* is provided on the protective film 82 disposed at the drive electrode end portion position overlapping the end portion 80*b* of the second drive electrode 80. In this case, the protective film 82 disposed at the drive electrode end portion position functions as the interlayer 215*e*. As illustrated in FIG. 18, the coupling positions of the first humidity detection wiring 941*e* and the second humidity detection wiring 942*e* to the wiring substrate 120 are disposed to be adjacent to both sides of the first drive wiring 91 so as to interpose the plurality of first drive wiring 91, the coupling positions being positions which face each other with the first drive wiring 91 interposed therebetween and are disposed on the inner side of the liquid ejecting head 510*e* with respect to the second drive wiring 92.

Figure 19:
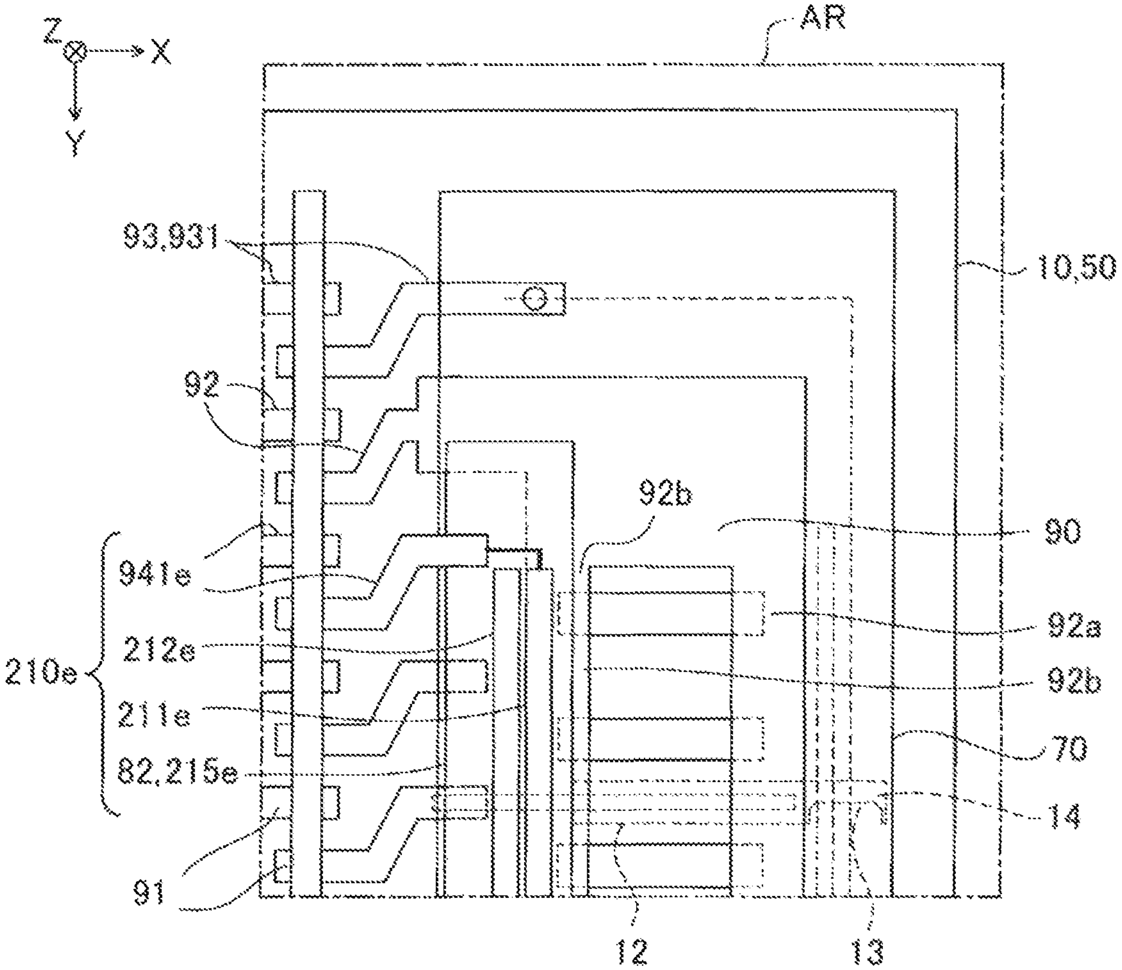
FIG. 19 is an enlarged explanatory diagram illustrating a partial range of FIG. 18.

FIG. 19 is an enlarged explanatory diagram illustrating a partial range AR of FIG. 18. As illustrated in FIG. 19, the first detection electrode 211*e* and the second detection electrode 212*e* are provided in the same layer on the upper surface of the protective film 82, and are disposed so as to face each other. Although detailed illustration of the shapes of the first detection electrode 211*e* and the second detection electrode 212*e* is omitted, any shape such as a linear shape, a flat plate shape, and a comb shape described above can be used.

With the liquid ejecting head 510*e* of the present embodiment, the first humidity detection wiring 941*e* and the second humidity detection wiring 942*e* are disposed between the first drive wiring 91 and the second drive wiring 92. Therefore, the same effect as that of the first embodiment can be obtained, and the humidity detection section 210*e* can be easily disposed in the holding portion 31. Further, when the humidity management section 250 or the like is provided on the wiring substrate 120 as an IC chip, routing of the conductor wirings on the wiring substrate 120 can be easily performed. Further, by using, as the interlayer 215*e*, the protective film 82 provided at the drive electrode end portion position, an increase in the number of components because of provision of the humidity detection section 210*e* can be suppressed.

F. Sixth Embodiment

Figure 20:
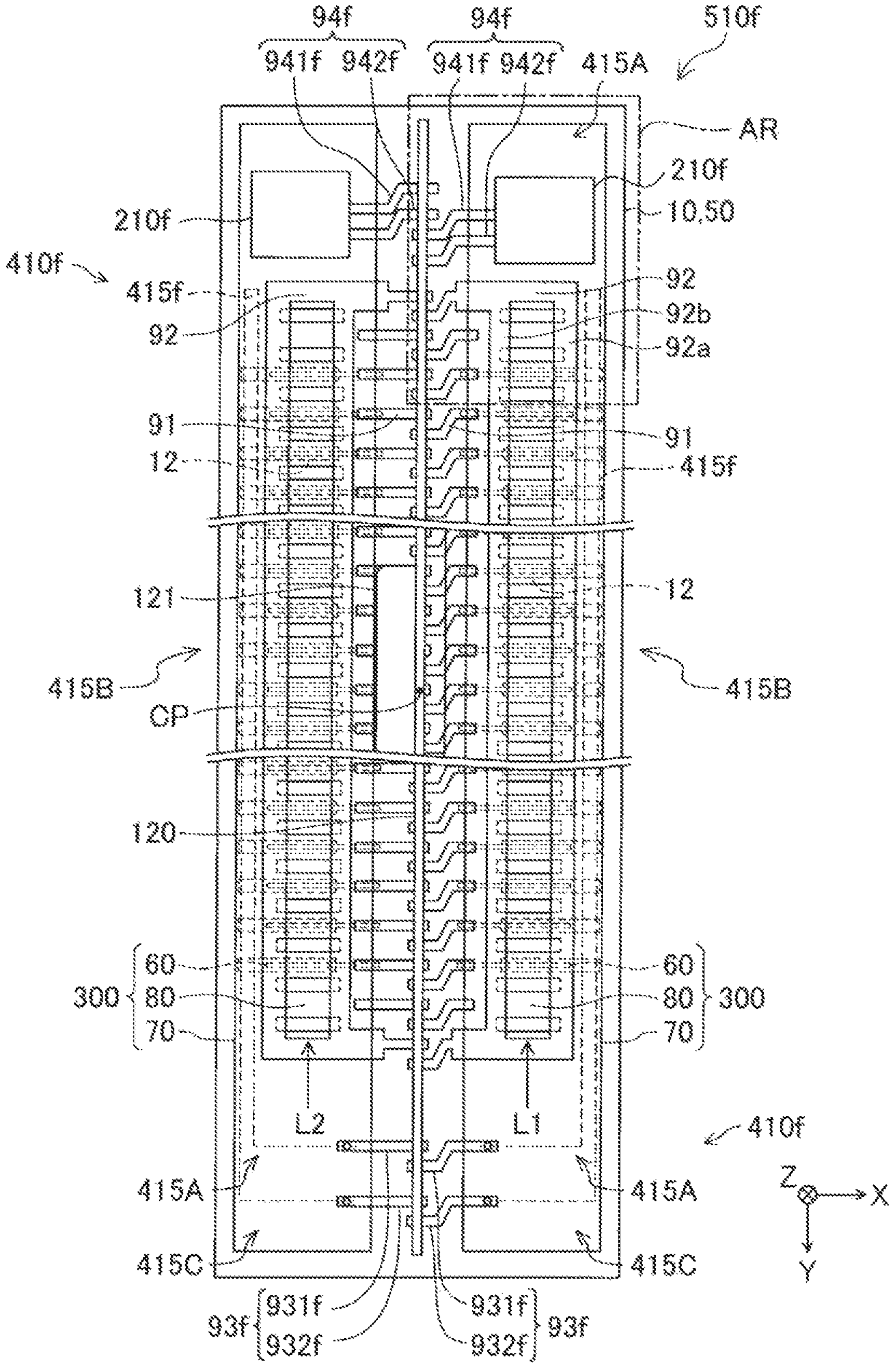
FIG. 20 is an explanatory diagram illustrating a configuration of a liquid ejecting head according to a sixth embodiment in plan view.

FIG. 20 is an explanatory diagram illustrating a configuration of a liquid ejecting head 510*f* according to a sixth embodiment in plan view. The liquid ejecting head 510*f* of the present embodiment is different from the liquid ejecting head 510 of the first embodiment in that the arrangement order of the first drive wiring 91, the second drive wiring 92, the temperature detection wiring 93*f*, and the humidity detection wiring 94*f* is different and the disposition positions of the humidity detection section 210*f* and the temperature detection section 410*f* are different, and other configurations are the same.

In plan view illustrated in FIG. 20, the first temperature detection wiring 931*f* and the second temperature detection wiring 932*f* of the temperature detection wiring 93*f* are disposed at positions opposite to the first humidity detection wiring 941*f* and the second humidity detection wiring 942*f* of the humidity detection wiring 94*f* with the first drive wiring 91 and the second drive wiring 92 interposed therebetween. That is, the coupling position of the temperature detection wiring 93*f* to the wiring substrate 120 and the coupling position of the humidity detection wiring 94*f* to the wiring substrate 120 are disposed so as to face each other with the first drive wiring 91 and the second drive wiring 92 interposed therebetween. With the liquid ejecting head 510*f* of the present embodiment, the humidity detection section 210*f* and the temperature detection section 410*f* can be individually assembled at the end portions of the wiring substrate 120, the humidity detection section 210*f* and the temperature detection section 410*f* can be easily disposed on the vibration plate 50, and the humidity management section 250 and the temperature management section 450 can be easily disposed on the wiring substrate 120. A mutual influence of noise in the temperature detection by the temperature detection section 410*f* and the humidity detection by the humidity detection section 210*f* can be suppressed or prevented.

G. Seventh Embodiment

Figure 21:
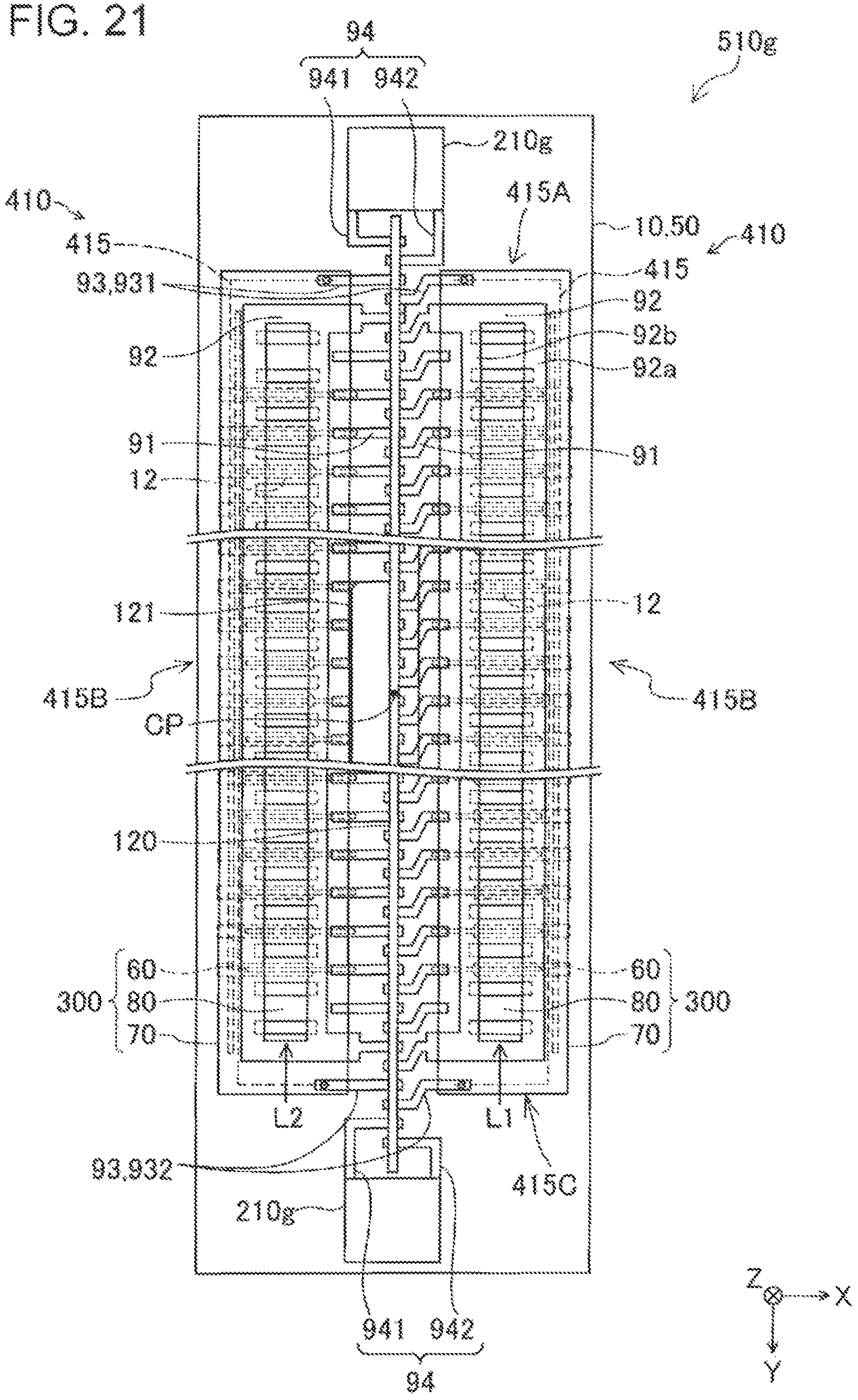
FIG. 21 is an explanatory diagram illustrating a configuration of a liquid ejecting head according to a seventh embodiment in plan view.

FIG. 21 is an explanatory diagram illustrating a configuration of a liquid ejecting head 510*g* according to a seventh embodiment in plan view. The first embodiment describes an example in which, in plan view, the humidity detection sections 210 are disposed at total four positions including positions adjacent to both sides of the first pressure chamber row L1 along the first arrangement direction and positions adjacent to both sides of the second pressure chamber row L2 along the second arrangement direction. On the other hand, as illustrated in FIG. 21, the humidity detection sections 210*g* may be disposed at positions adjacent to both sides of the wiring substrate 120 along the Y-axis direction which is the first arrangement direction. Alternatively, the humidity detection sections 210*g* may be disposed only at a position adjacent to any one side of the wiring substrate 120 along the Y-axis direction.

The configuration of the humidity detection section 210*g* other than the disposition position is the same as the configuration of the humidity detection section 210 described in the first embodiment. The arrangement order of the first drive wiring 91, the second drive wiring 92, the temperature detection wiring 93, and the humidity detection wiring 94 is the same as the arrangement order in the first embodiment. The first drive wiring 91, the second drive wiring 92, the temperature detection wiring 93, and the humidity detection wiring 94 are arranged in this order from the center CP of the liquid ejecting head 510*g* toward the outer side of the liquid ejecting head 510*g*.

With the liquid ejecting head 510*g* configured as described above, the humidity detection section 210*g* can be disposed at a position separated from the piezoelectric element 300 as compared with when the humidity detection section is adjacent to each pressure chamber row. Thus, an influence of noise of the drive signal of the piezoelectric element 300 on the humidity detection section 210*g* can be reduced. When one holding portion 31 common to a plurality of pressure chamber rows such as the first pressure chamber row L1 and the second pressure chamber row L2 is provided, the number of the humidity detection sections 210 can be reduced, and thus information on humidity can be efficiently acquired.

H. Another Embodiment (H1) In each of the embodiments, an example in which the piezoelectric element 300 is used as the drive element is described. On the other hand, as the drive element, a heat generation element including a heater may be used. In this case, a heater is provided in each pressure chamber, and the ink is ejected from the nozzles by changing the pressure in the pressure chamber by using bubbles generated when the heater is heated. The same advantage as in each of the embodiments can be obtained even in the liquid ejecting head according to the aspect.

I. Other Aspects

The present disclosure is not limited to the above-described embodiments, and can be realized in various configurations without departing from the gist of the present disclosure. For example, technical features in the embodiments corresponding to technical features in respective aspects described in outline of the present disclosure can be appropriately replaced or combined in order to solve some or all of the above-described problems or achieve some or all of the above-described effects. Further, as long as the technical feature is not described as essential in the present specification, the technical feature can be appropriately deleted.

(1) According to one aspect of the present disclosure, there is provided a liquid ejecting head. A liquid ejecting head includes: a wiring substrate; a plurality of pressure chambers that accommodate a liquid and communicate with nozzles; a drive element that is electrically coupled to the wiring substrate and changes a pressure in the pressure chamber; and a humidity detection section that is electrically coupled to the wiring substrate and is disposed for detection of humidity.

With the liquid ejecting head according to the aspect, information on the humidity of the drive element can be detected by a simple structure in which the drive element and the temperature detection section are coupled to one wiring substrate.

(2) In the liquid ejecting head according to the aspect, the drive element may be a piezoelectric element including a first drive electrode, a second drive electrode, and a piezoelectric body, and the piezoelectric body may be provided between the first drive electrode and the second drive electrode in a lamination direction in which the first drive electrode, the second drive electrode, and the piezoelectric body are laminated. The first drive electrode may be individually provided for each of the plurality of pressure chambers, and the second drive electrode may be commonly provided for the plurality of pressure chambers.

With the liquid ejecting head according to the aspect, information on the humidity of the piezoelectric element among the component members of the liquid ejecting head can be detected, and the influence of the humidity on the piezoelectric element and the member in the vicinity of the piezoelectric element can be appropriately managed.

(3) The liquid ejecting head according to the aspect may further include: a vibration plate that is provided on one side of the lamination direction with respect to the piezoelectric element and is deformed by driving of the piezoelectric element; and a pressure chamber substrate that is provided on one side of the lamination direction with respect to the vibration plate and is provided with the plurality of pressure chambers. The humidity detection section may include an interlayer that is laminated on one of the piezoelectric body, the vibration plate, and the pressure chamber substrate and whose resistance or capacitance changes according to humidity, a first detection electrode in contact with the interlayer, and a second detection electrode that is in contact with the interlayer and faces the first detection electrode.

With the liquid ejecting head according to the aspect, information on humidity of the interlayer, which is laminated on at least one of the piezoelectric body, the vibration plate, or the pressure chamber substrate, can be detected with high accuracy by using the resistance between the first detection electrode and the second detection electrode. Therefore, an influence of humidity on the piezoelectric element or the member in the vicinity of the piezoelectric element can be appropriately managed.

(4) In the liquid ejecting head according to the aspect, at least one of the first detection electrode and the second detection electrode may be formed of the same material as a material of the first drive electrode.

With the liquid ejecting head according to the aspect, the process of forming the first detection electrode and the second detection electrode can be shared with the process of forming the first drive electrode, and thus productivity of the liquid ejecting head can be improved.

(5) In the liquid ejecting head according to the aspect, at least one of the first detection electrode and the second detection electrode may be formed of the same material as a material of the second drive electrode.

With the liquid ejecting head according to the aspect, the process of forming the first detection electrode and the second detection electrode can be shared with the process of forming the second drive electrode, and thus productivity of the liquid ejecting head can be improved.

(6) The liquid ejecting head according to the aspect may further include: a drive wiring that electrically couples the wiring substrate and the drive element; and a humidity detection wiring that electrically couples the wiring substrate and the humidity detection section. The drive wiring may include a first drive wiring that electrically couples the wiring substrate and the first drive electrode, and a second drive wiring that electrically couples the wiring substrate and the second drive electrode. The humidity detection section may include a first humidity detection wiring that electrically couples the wiring substrate and the first detection electrode, and a second humidity detection wiring that electrically couples the wiring substrate and the second detection electrode. With the liquid ejecting head according to the aspect, by using a simple configuration of the drive wirings and the humidity detection wirings for humidity detection, both the piezoelectric element and the humidity detection section can be electrically coupled to one wiring substrate.

(7) In the liquid ejecting head according to the aspect, the first drive wiring, the second drive wiring, the first humidity detection wiring, and the second humidity detection wiring may be formed of the same material.

With the liquid ejecting head according to the aspect, the process of forming the humidity detection wiring and the process of forming the first drive wiring and the second drive wiring can be shared, and thus productivity of the liquid ejecting head can be improved.

(8) In the liquid ejecting head according to the aspect, in plan view of the liquid ejecting head along the lamination direction, the first drive wiring and the second drive wiring may be disposed at positions that are not interposed between the first humidity detection wiring and the second humidity detection wiring.

With the liquid ejecting head according to the aspect, by disposing the first humidity detection wiring and the second humidity detection wiring at positions separated from the first drive wiring and the second drive wiring, an influence of noise of the drive voltage on the humidity detection can be suppressed or prevented.

(9) In the liquid ejecting head according to the aspect, in plan view of the liquid ejecting head along the lamination direction, the first humidity detection wiring and the second humidity detection wiring may be disposed between the first drive wiring and the second drive wiring.

With the liquid ejecting head according to the aspect, when providing an IC chip for humidity management on the wiring substrate, routing of the conductor wirings on the wiring substrate can be easily performed.

(10) In the liquid ejecting head according to the aspect, in plan view of the liquid ejecting head along the lamination direction, the first humidity detection wiring and the second humidity detection wiring may be further disposed on an outer side of the liquid ejecting head with respect to the first drive wiring and the second drive wiring.

With the liquid ejecting head according to the aspect, by disposing the first humidity detection wiring and the second humidity detection wiring at positions separated from the first drive wiring and the second drive wiring, an influence of noise of the drive voltage on the humidity detection can be suppressed or prevented.

(11) In the liquid ejecting head according to the aspect, the first drive electrode may be provided on one side of the lamination direction with respect to the piezoelectric body, and the second drive electrode may be provided on another side of the lamination direction with respect to the piezoelectric body.

(12) The liquid ejecting head according to the aspect may further include: a temperature detection section that is electrically coupled to the wiring substrate and detects a temperature.

With the liquid ejecting head according to the aspect, information on the humidity and the temperature of the drive element can be detected by a simple structure in which the temperature detection section is coupled to one wiring substrate together with the drive element and the humidity detection section.

(13) In the liquid ejecting head according to the aspect, the temperature detection section may include a temperature detection resistor of which resistance changes according to a temperature, a first temperature detection wiring that is coupled to one end of the temperature detection resistor, and a second temperature detection wiring that is coupled to another end of the temperature detection resistor.

With the liquid ejecting head according to the aspect, by using the temperature detection resistor, a temperature detection mechanism can be provided in a narrow region in the vicinity of the pressure chamber.

(14) In the liquid ejecting head according to the aspect, in plan view of the liquid ejecting head along the lamination direction, the first humidity detection wiring and the second humidity detection wiring may be further disposed on an outer side of the liquid ejecting head with respect to the first drive wiring, and the first temperature detection wiring and the second temperature detection wiring may be further disposed on an outer side of the liquid ejecting head with respect to the first humidity detection wiring and the second humidity detection wiring.

With the liquid ejecting head according to the aspect, by disposing the first temperature detection wiring and the second temperature detection wiring to be separated from the first drive wiring, an influence of noise of the drive voltage on the temperature detection can be suppressed or prevented.

(15) In the liquid ejecting head according to the aspect, in plan view of the liquid ejecting head along the lamination direction, the first temperature detection wiring, the first humidity detection wiring, the second drive wiring, and the first drive wiring may be disposed in this order from the outer side of the liquid ejecting head toward a center of the liquid ejecting head.

With the liquid ejecting head according to the aspect, by further disposing the temperature detection wiring on the outer side of the liquid ejecting head with respect to the humidity detection wiring, an influence of noise of the drive voltage on the temperature detection wiring can be suppressed by the humidity detection wiring, and thus an influence of noise of the drive voltage on temperature detection can be further reduced.

(16) In the liquid ejecting head according to the aspect, in plan view of the liquid ejecting head along the lamination direction, the first temperature detection wiring and the second temperature detection wiring may be further disposed on an outer side of the liquid ejecting head with respect to the first drive wiring and the second drive wiring. The first humidity detection wiring and the second humidity detection wiring may be further disposed on an outer side of the liquid ejecting head with respect to the first temperature detection wiring and the second temperature detection wiring.

With the liquid ejecting head according to the aspect, the first humidity detection wiring and the second humidity detection wiring can be disposed at positions separated from the first drive wiring and the second drive wiring, and thus an influence of noise of the drive voltage on the humidity detection can be suppressed or prevented.

(17) In the liquid ejecting head according to the aspect, in plan view of the liquid ejecting head along the lamination direction, the first drive wiring and the second drive wiring may be disposed at positions that are interposed between the first temperature detection wiring and the second temperature detection wiring, and the first humidity detection wiring and the second humidity detection wiring.

With the liquid ejecting head according to the aspect, the humidity detection wiring and the temperature detection wiring can be assembled at both ends of the wiring substrate, and thus arrangement on the wiring substrate can be easily performed.

(18) In the liquid ejecting head according to the aspect, in plan view of the liquid ejecting head along the lamination direction, an area of a temperature detection region surrounded by the temperature detection resistor may be larger than an area of a region in which the interlayer is disposed.

With the liquid ejecting head according to the aspect, by making an area of a region in which the interlayer is disposed smaller than an area of a temperature detection region, the humidity detection section and the temperature detection section can be efficiently disposed.

(19) According to another aspect of the present disclosure, there is provided a liquid ejecting apparatus. A liquid ejecting apparatus includes: the liquid ejecting head according to the aspect; a humidity-detection resistance measurement section that measures resistance between the first detection electrode and the second detection electrode; and a humidity management section that acquires information on humidity of the interlayer by using the resistance which is measured by the humidity-detection resistance measurement section.

With the liquid ejecting apparatus according to the aspect, the liquid ejecting apparatus that can appropriately manage the information on the humidity in the member in the liquid ejecting head can be provided.

(20) According to still another aspect of the present disclosure, there is provided a liquid ejecting apparatus including: the liquid ejecting head according to the aspect; a capacitance measurement section that measures capacitance between the first detection electrode and the second detection electrode; and a humidity management section that acquires information on humidity of the interlayer by using the capacitance which is measured by the capacitance measurement section.

With the liquid ejecting apparatus according to the aspect, information on humidity in the member in the liquid ejecting head can be appropriately managed.

(21) In the liquid ejecting apparatus according to the aspect, the humidity management section may be provided on the wiring substrate.

With the liquid ejecting apparatus according to the aspect, an increase in the size of the liquid ejecting apparatus can be suppressed.

(22) In the liquid ejecting head according to the aspect, the drive element may be a heat generation element including a heater.

With the liquid ejecting head according to the aspect, information on the humidity of the drive element can be detected by a simple structure in which the heat generation element including a heater and the temperature detection section are coupled to one wiring substrate.

The present disclosure can also be realized in various aspects other than the liquid ejecting apparatus and the liquid ejecting head. For example, the present disclosure can be realized in aspects of a method for manufacturing a liquid ejecting head, a method for manufacturing a liquid ejecting apparatus, or the like.

The present disclosure is not limited to an ink jet method, and can be applied to any liquid ejecting apparatuses that ejects a liquid other than ink and a liquid ejecting head that is used in the liquid ejecting apparatuses. For example, the present disclosure can be applied to the following various liquid ejecting apparatuses and liquid ejecting heads thereof.

(1) An image recording apparatus such as a facsimile apparatus.

(2) A color material ejecting apparatus used for manufacturing a color filter for an image display apparatus such as a liquid crystal display.

(3) An electrode material ejecting apparatus used for forming electrodes of an organic Electro Luminescence (EL) display, a Field Emission Display (FED), or the like.

(4) A liquid ejecting apparatus that ejects a liquid containing a bioorganic substance used for manufacturing a biochip.

(5) A sample ejecting apparatus as a precision pipette.

(6) A lubricating oil ejecting apparatus.

(7) A resin liquid ejecting apparatus.

(8) A liquid ejecting apparatus that ejects lubricating oil with pinpoint to a precision machine such as a watch or a camera.

(9) A liquid ejecting apparatus that ejects a transparent resin liquid, such as an ultraviolet curable resin liquid, onto a substrate in order to form a micro hemispherical lens (optical lens) or the like used for an optical communication element or the like.

(10) A liquid ejecting apparatus that ejects an acidic or alkaline etching liquid for etching a substrate or the like.

(11) A liquid ejecting apparatus including a liquid consumption head that ejects any other minute amount of droplets.

Further, the "liquid" may be any material that can be consumed by the liquid ejecting apparatus. For example, the "liquid" may be a material in a state when a substance is liquefied, and the "liquid" includes a liquid state material with high or low viscosity and a liquid state material, such as a sol, gel water, other inorganic solvent, organic solvent, solution, liquid resin, and liquid metal (metal melt). Further, the "liquid" includes not only a liquid as a state of a substance but also a liquid in which particles of a functional material made of a solid substance, such as a pigment or a metal particle, are dissolved, dispersed, or mixed in a solvent. Further, the following is mentioned as a typical example of a liquid.

(1) Adhesive main agent and curing agent.

(2) Paint-based paints and diluents, clear paints and diluents.

(3) Main solvent and diluting solvent containing cells of ink for cells.

(4) Metallic leaf pigment dispersion liquid and diluting solvent of ink (metallic ink) that develops metallic luster.

(5) Gasoline/diesel and biofuel for vehicle fuel.

(6) Main ingredients and protective ingredients of medicine.

(7) Light Emitting Diode (LED) fluorescent material and encapsulant.

What is claimed is:

1. A liquid ejecting head comprising:

a wiring substrate;

a plurality of pressure chambers that accommodate a liquid and communicate with nozzles;

a drive element that is electrically coupled to the wiring substrate and changes a pressure in the pressure chamber, the drive element being a piezoelectric element including a first drive electrode, a second drive electrode, and a piezoelectric body, the piezoelectric body being provided between the first drive electrode and the second drive electrode in a lamination direction in which the first drive electrode, the piezoelectric body, and the second drive electrode are laminated;

a humidity detection section that is electrically coupled to the wiring substrate and is disposed for detection of humidity:

a vibration plate that is provided on one side of the lamination direction with respect to the piezoelectric element and is deformed by driving of the piezoelectric element; and a pressure chamber substrate that is provided on one side of the lamination direction with respect to the vibration plate and is provided with the plurality of pressure chambers, wherein the humidity detection section includes an interlayer that is laminated on at least one of the piezoelectric body, the vibration plate, or the pressure chamber substrate and whose resistance or capacitance changes according to humidity, a first detection electrode that is in contact with the interlayer, and a second detection electrode that is in contact with the interlayer and faces the first detection electrode.

2. The liquid ejecting head according to claim 1, wherein the first drive electrode is individually provided for each of the plurality of pressure chambers, and the second drive electrode is commonly provided for the plurality of pressure chambers.

3. The liquid ejecting head according to claim 2, wherein the first drive electrode is provided on one side of the lamination direction with respect to the piezoelectric body, and the second drive electrode is provided on another side of the lamination direction with respect to the piezoelectric body.

4. The liquid ejecting head according to claim 1, wherein at least one of the first detection electrode and the second detection electrode is formed of the same material as a material of the first drive electrode.

5. The liquid ejecting head according to claim 1, wherein at least one of the first detection electrode and the second detection electrode is formed of the same material as a material of the second drive electrode.

6. The liquid ejecting head according to claim 1, further comprising:

a drive wiring that electrically couples the wiring substrate and the drive element; and a humidity detection wiring that electrically couples the wiring substrate and the humidity detection section, wherein the drive wiring includes a first drive wiring that electrically couples the wiring substrate and the first drive electrode, and a second drive wiring that electrically couples the wiring substrate and the second drive electrode, and the humidity detection section includes a first humidity detection wiring that electrically couples the wiring substrate and the first detection electrode, and a second humidity detection wiring that electrically couples the wiring substrate and the second detection electrode.

7. The liquid ejecting head according to claim 6, wherein the first drive wiring, the second drive wiring, the first humidity detection wiring, and the second humidity detection wiring are formed of the same material.

8. The liquid ejecting head according to claim 6, wherein in plan view of the liquid ejecting head along the lamination direction, the first drive wiring and the second drive wiring are disposed at positions that are not interposed between the first humidity detection wiring and the second humidity detection wiring.

9. The liquid ejecting head according to claim 6, wherein in plan view of the liquid ejecting head along the lamination direction, the first humidity detection wiring and the second humidity detection wiring are disposed between the first drive wiring and the second drive wiring.

10. The liquid ejecting head according to claim 6, wherein in plan view of the liquid ejecting head along the lamination direction, the first humidity detection wiring and the second humidity detection wiring are further disposed on an outer side of the liquid ejecting head with respect to the first drive wiring and the second drive wiring.

11. The liquid ejecting head according to claim 6, further comprising:

a temperature detection section that is electrically coupled to the wiring substrate and detects a temperature.

12. The liquid ejecting head according to claim 11, wherein the temperature detection section includes a temperature detection resistor of which resistance changes according to a temperature, a first temperature detection wiring that is coupled to one end of the temperature detection resistor, and a second temperature detection wiring that is coupled to another end of the temperature detection resistor.

13. The liquid ejecting head according to claim 12, wherein in plan view of the liquid ejecting head along the lamination direction, the first humidity detection wiring and the second humidity detection wiring are further disposed on an outer side of the liquid ejecting head with respect to the first drive wiring, and the first temperature detection wiring and the second temperature detection wiring are further disposed on an outer side of the liquid ejecting head with respect to the first humidity detection wiring and the second humidity detection wiring.

14. The liquid ejecting head according to claim 13, wherein in plan view of the liquid ejecting head along the lamination direction, the first temperature detection wiring, the first humidity detection wiring, the second drive wiring, and the first drive wiring are disposed in this order from an outer side of the liquid ejecting head toward a center of the liquid ejecting head.

15. The liquid ejecting head according to claim 12, wherein in plan view of the liquid ejecting head along the lamination direction, the first temperature detection wiring and the second temperature detection wiring are further disposed on an outer side of the liquid ejecting head with respect to the first drive wiring and the second drive wiring, and the first humidity detection wiring and the second humidity detection wiring are further disposed on an outer side of the liquid ejecting head with respect to the first temperature detection wiring and the second temperature detection wiring.

16. The liquid ejecting head according to claim 12, wherein in plan view of the liquid ejecting head along the lamination direction, the first drive wiring and the second drive wiring are disposed at positions that are interposed between the first temperature detection wiring and the second temperature detection wiring, and the first humidity detection wiring and the second humidity detection wiring.

17. The liquid ejecting head according to claim 12, wherein in plan view of the liquid ejecting head along the lamination direction, an area of a temperature detection region surrounded by the temperature detection resistor is larger than an area of a region in which the interlayer is disposed.

18. A liquid ejecting apparatus comprising:

the liquid ejecting head according to claim 1;

a humidity-detection resistance measurement section that measures resistance between the first detection electrode and the second detection electrode; and a humidity management section that acquires information on humidity of the interlayer by using the resistance which is measured by the humidity-detection resistance measurement section.

19. A liquid ejecting apparatus comprising:

the liquid ejecting head according to claim 1;

a capacitance measurement section that measures capacitance between the first detection electrode and the second detection electrode; and a humidity management section that acquires information on humidity of the interlayer by using the capacitance which is measured by the capacitance measurement section.

* * * * *